US009141197B2

(12) United States Patent
MacDougall et al.

(10) Patent No.: US 9,141,197 B2
(45) Date of Patent: Sep. 22, 2015

(54) INTERACTING WITH A DEVICE USING GESTURES

(71) Applicant: QUALCOMM Incorporated, San Diego, CA (US)

(72) Inventors: Francis B. MacDougall, Toronto (CA); Evan R. Hildreth, Thornhill (CA)

(73) Assignee: QUALCOMM Incorporated, San Diego, CA (US)

( * ) Notice: Subject to any disclaimer, the term of this patent is extended or adjusted under 35 U.S.C. 154(b) by 135 days.

(21) Appl. No.: 13/799,839

(22) Filed: Mar. 13, 2013

(65) Prior Publication Data

US 2013/0271360 A1 Oct. 17, 2013

Related U.S. Application Data

(60) Provisional application No. 61/625,076, filed on Apr. 16, 2012.

(51) Int. Cl.
  G06F 3/01 (2006.01)
  G06F 3/0484 (2013.01)
  H04M 1/725 (2006.01)
  H04M 1/247 (2006.01)

(52) U.S. Cl.
  CPC .............. *G06F 3/017* (2013.01); *G06F 3/0484* (2013.01); *H04M 1/247* (2013.01); *H04M 1/72519* (2013.01); *H04M 2250/12* (2013.01); *H04M 2250/52* (2013.01)

(58) Field of Classification Search
  None
  See application file for complete search history.

(56) References Cited

U.S. PATENT DOCUMENTS

| 6,331,851 | B1 * | 12/2001 | Suzuki et al. ................. 345/419 |
| 6,755,745 | B1 * | 6/2004 | Seto et al. ........................ 463/43 |
| 6,985,620 | B2 * | 1/2006 | Sawhney et al. .............. 382/154 |
| 7,665,041 | B2 | 2/2010 | Wilson et al. |
| 8,933,876 | B2 | 1/2015 | Galor et al. |
| 2008/0052643 | A1 | 2/2008 | Ike et al. |
| 2008/0231926 | A1 | 9/2008 | Klug et al. |
| 2009/0109036 | A1 | 4/2009 | Schalla et al. |
| 2009/0315740 | A1 | 12/2009 | Hildreth et al. |
| 2011/0110560 | A1 | 5/2011 | Adhikari |
| 2011/0243380 | A1 | 10/2011 | Forutanpour et al. |

(Continued)

OTHER PUBLICATIONS

International Search Report and Written Opinion—PCT/US2013/035930—ISA/EPO—Jul. 11, 2013.

*Primary Examiner* — Peter Vincent Agustin
(74) *Attorney, Agent, or Firm* — Kilpatrick Townsend Stockton LLP

(57) ABSTRACT

Systems, methods, apparatuses, and computer-readable media for are provided for engaging and re-engaging a gesture mode. In one embodiment, a method performed by the computer system detects an initial presence of a user pose, indicates to a user progress toward achieving a predetermined state while continuing to detect the user pose, determines that the detection of the user pose has reached the predetermined state, and responds to the detection of the user pose based on determining that the detection has reached the predetermined state. The computer system may further prompt the user by displaying a representation of the user pose corresponding to an option for a user decision, detecting the user decision based at least in part on determining that the detection of the user pose has reached the predetermined state, and responding to the user decision.

37 Claims, 12 Drawing Sheets

(56) References Cited

U.S. PATENT DOCUMENTS

| | | |
|---|---|---|
| 2011/0302424 A1 | 12/2011 | Horne et al. |
| 2011/0302524 A1* | 12/2011 | Forstall ........................ 715/781 |
| 2012/0052942 A1 | 3/2012 | Esaki et al. |
| 2012/0093360 A1 | 4/2012 | Subramanian et al. |
| 2012/0320080 A1* | 12/2012 | Giese et al. ................... 345/619 |
| 2013/0271360 A1* | 10/2013 | Macdougall et al. ......... 345/156 |
| 2013/0271458 A1* | 10/2013 | Andriluka et al. ............ 345/420 |
| 2014/0109018 A1* | 4/2014 | Casey et al. ................... 715/863 |

\* cited by examiner

INTERACTING WITH A DEVICE USING GESTURES

CROSS-REFERENCE TO RELATED APPLICATIONS

This patent application claims the benefit of U.S. Provisional Patent Application Ser. No. 61/625,076 filed Apr. 16, 2012, and titled "INTERACTING WITH A DEVICE USING GESTURES," which is incorporated by reference herein in its entirety for all purposes.

BACKGROUND

Aspects of the disclosure relate to computing technologies. In particular, aspects of the disclosure relate to systems, methods, apparatuses, and computer-readable media that perform gesture recognition.

Increasingly, computing devices, such as smart phones, tablet computers, personal digital assistants (PDAs), and other devices, include touch screens, accelerometers, cameras, proximity sensors, microphones, and/or other sensors that may allow these devices to capture motion and/or other sensed conditions as a form of user input. In some devices, for instance, particular movements and/or occurrences may be recognized, for instance, as gestures that correspond to particular commands in different situations. For example, a device may recognize a gesture, such as a left swipe (e.g., in which a user waves their hand in front of the device to the left), as corresponding to a "previous page" command while a browser application is displayed and a "previous track" command while a media player application is displayed. In this example, a user may cause the device to execute these commands by performing the corresponding gestures in each of these situations. Improved gesture recognition may be beneficial in many circumstances.

BRIEF SUMMARY

These benefits and others may be realized according to embodiments of the present invention, described herein. Further, embodiments may solve problems associated with engaging a gesture control system.

Systems, methods, apparatuses, and computer-readable media are provided herein. In one embodiment, the method performed by the computer system prompts the user for a first pose, detects the first pose and responds to the detection of the first pose. In some embodiments, a pose may comprise an engagement gesture, for example when the computing system is appropriately configured and/or when the pose is followed by a further motion. Furthermore, a pose may be performed by and include hands, arms, legs, facial features, etc. or even other objects that an individual may be carrying or wielding. The first pose may be performed by a user extremity such as a hand and may comprise a hand-pose or a motion accompanying a hand-pose. The computer system may differentiate between a left hand and a right hand in responding to the pose. Exemplary embodiments of the invention may be used in acknowledging a prompt from the computer system, cancelling or accepting a course of action, unlocking a computer system, and accepting or rejecting a call. In some embodiments, a pose may comprise a type of gesture, and embodiments describing a gesture may be used when the gesture comprises a pose. Further, embodiments discussed with respect to a pose may be used with other gestures in some implementations.

In some embodiments, a method includes detecting an initial presence of a user pose. The method may further include indicating to a user progress toward achieving a predetermined state of detection while continuing to detect the user pose. The method may further include determining that the predetermined state of detection has been achieved. The method may further include responding to the user pose based on determining that the predetermined state of detection has been achieved.

In some embodiments, the method further includes prompting the user by displaying a representation of a plurality of potential user poses comprising the user pose, each of the plurality of potential user poses corresponding to an option for a user decision. The method may further include detecting the user decision based at least in part on determining that the predetermined state of detection has been achieved. The responding may include responding to the user decision.

In some embodiments, the determining further comprises obtaining and analyzing a plurality of images.

In some embodiments, the responding further comprises accepting acknowledgment for a notification event.

In some embodiments, the detecting step further comprises detecting a hand pose of the user.

In some embodiments, the predetermined state comprises the user pose having been detected for a predetermined period of time.

In some embodiments, the predetermined state comprises detection of the user pose reaching a particular confidence level.

In some embodiments, the indicating comprises displaying a circular indication bar comprising a plurality of regions, wherein the plurality of regions indicate the progress.

In some embodiments, the indicating comprises displaying an animated image of the user pose, wherein portions of the displayed image of the user pose are selectively animated to indicate the progress.

In some embodiments, the indicating comprises displaying a percentage toward achieving the predetermined state.

In some embodiments, the indicating comprises providing to the user sequential indications of the progress until it has been determined that the predetermined state has been achieved or until the user pose is no longer detected.

In some embodiments, the method further comprises providing to the user an indication of a user motion to be completed subsequent to the predetermined state being achieved.

In some embodiments, an apparatus includes an image capture device configured to capture images and a user output device configured to provide output to a user. The apparatus may further include a processor coupled to the image capture device and the user output device. The processor may be configured to detect an initial presence of a user pose based on images captured by the image capture device. The processor may further be configured to cause the user output device to indicate to a user progress toward achieving a predetermined state of detection while continuing to detect the user pose. The processor may further be configured to, having caused the progress to be indicated to the user, determine that the predetermined state of detection has been achieved. The processor may further be configured to respond to the user pose based on determining that the predetermined state of detection has been achieved.

In some embodiments, an apparatus includes means for detecting an initial presence of a user pose. The apparatus may further include means for indicating to a user progress toward achieving a predetermined state of detection while continuing to detect the user pose. The apparatus may further include means for determining that the predetermined state of detection has been achieved after progress has been indicated to the user. The apparatus may further include means for responding to the user pose based on determining that the predetermined state of detection has been achieved.

In some embodiments, a non-transitory processor-readable medium includes processor-readable instructions configured to cause a processor to detect an initial presence of a user pose. The instructions may be further configured to cause the processor to indicate to a user progress toward achieving a predetermined state of detection while continuing to detect the user pose. Having indicated progress to the user, the instructions may be further configured to cause the processor to determine that the predetermined state of detection has been achieved. The instructions may be further configured to cause the processor to respond to the user pose based on determining that the predetermined state of detection has been achieved.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
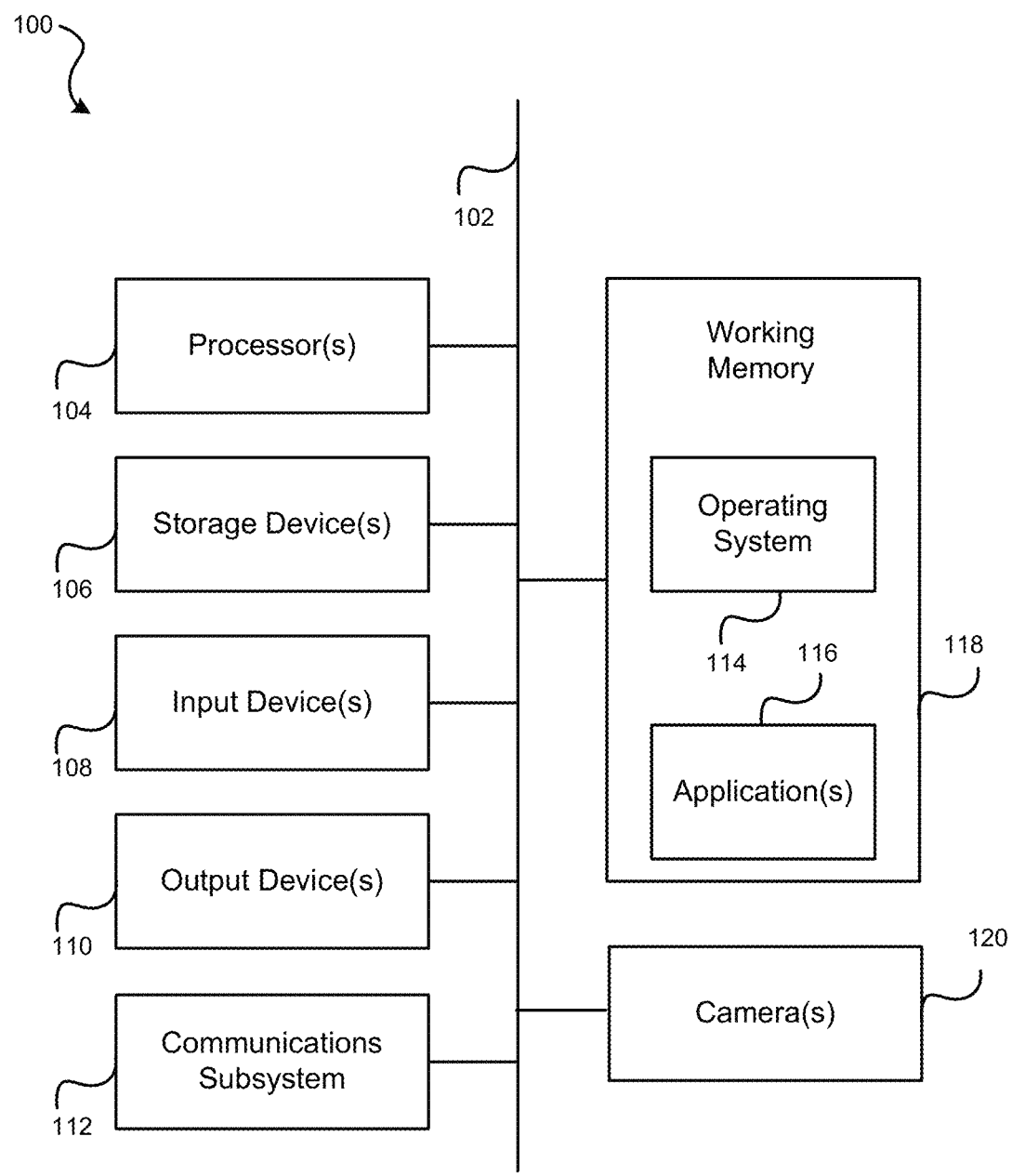
FIG. 1 illustrates an exemplary computer system according to some embodiments.

Aspects of the disclosure provide more convenient, intuitive, and functional ways of performing gesture recognition. In a touch system, the finger touches the glass, and then moves in the direction of the gesture, and then lifts from the glass, requiring touch interaction with the user. However, there are many situations where a user may not be able to or may not want to touch the screen in order to respond to a prompt. For example, a user may be driving a car and may not want to take their eyes off the road to touch a specific button or region in a user interface. These and many other scenarios point out the shortcomings of having interfaces which can only be activated through touch.

For illustrative purposes, embodiments of the invention are described herein using a hand pose. However, any user extremity may be used for poses and gestures. In some embodiments, the user's body, face, or head may be used to perform a gesture. Further, a control object associated with and/or controlled by a user may be used to perform a pose or gesture in some embodiments. The control object may comprise, for example, a person's hand or something held or worn by the user. As an example, a wand may be a control object. Those of skill in the art will recognize other gestures that may be performed.

In some embodiments, a pose may comprise an engagement gesture, for example when the computing system is appropriately configured and/or when the pose is followed by a further motion. Furthermore, a pose may be performed by and include hands, arms, legs, facial features, etc. or even other objects that an individual may be carrying or wielding. In the following embodiments, the term "desired result" refers to activating the user interface event that the gesture is meant to invoke. In some implementations, a simulated "touch" event can be sent to the device in the form of selection of a displayed prompt using, for example, a hand pose. In some embodiments, a user may perform a pose such as "swipe left" or "swipe right" to navigate between options displayed on the device. In some implementations, an application on the device may have gesture detection capabilities built in for interpreting gestures captured by the device (e.g., by an input device such as a camera). In yet other implementations, a direct connection from the application to a separate gesture system can be created and gesture messages can be interpreted by the gesture system and sent directly to the application, wherein the application may reside in a working memory of the device and a processor of the device may execute the application instructions. These elements are described in greater detail below with respect to FIG. 1.

Using embodiments of the invention, a computer system may be unlocked, for example, without being touched by having a user perform a known pose. For example, a camera may be associated with the computer system, and the user may perform the pose in the view of the camera associated with the computer system. In some embodiments, other detection capable devices may be associated with the computer system including, but not limited to, ultrasound sensor, electromagnetic radiation sensor, microelectromechanical systems (MEMS) based devices, and a controller device which includes inertial sensors. The user may perform a pose in a manner that these other detection capable devices may detect. The computer system may be unlocked if the pose corresponds to a pre-defined gesture for unlocking the computer system and/or a predetermined state of detection has been achieved. In some embodiments, the user may perform any pose when prompted by a device, and the device may acknowledge or respond to that pose once the predetermined state of detection is achieved. A pose could be a hand pose or gesture, and a cursor may be displayed on the computer system which reflects the hand position of a user. In some embodiments, a gesture may be performed by a user moving one or more hands in the air along predefined path(s), or by any combination of the above methods. In some embodiments, the pose may comprise an engagement gesture, for example when the computing system is appropriately configured and/or when the pose is followed by a further motion. Furthermore, a pose may be performed by and include hands, arms, legs, facial features, etc. or even other objects that an individual may be carrying or wielding. The computer system may also display visual cues of the predefined gesture on its screen to remind a user of the gesture. Additionally, a computer system with a camera may enable a user to acknowledge any prompt without touching the computer system through a similar mechanism. Additionally, for prompts which have two possible responses, like answer/ignore, or OK/CANCEL, two pre-defined gestures could be used, one for each possible response. In particular, if a visual cue showed one response option on one side of the display, and the other response option on the other side of the display, then the same hand pose could be used for selecting the desired response, but the user could use their right hand in that pose to select the right side option, and their left hand in that pose to select the left side option. Additionally, suitable visual prompts of the specific hand pose or gesture for each option could be displayed as cues for the user as before.

Several illustrative embodiments will now be described with respect to the accompanying drawings, which form a part hereof. While particular embodiments, in which one or more aspects of the disclosure may be implemented, are described above, other embodiments may be used and various modifications may be made without departing from the scope of the disclosure or the spirit of the appended claims. All of the embodiments described above may be practiced in such systems such as a computer system. Embodiments below may refer to detection of a pose or gesture or other input provided by a user with a camera. As discussed above, however, other detection capable devices which may be used include, but are not limited to, ultrasound sensor, electromagnetic radiation sensor, microelectromechanical systems (MEMS) based devices, and a controller device. Thus, in each of the examples below which describe a camera, the camera may be replaced or used in addition to any of the sensors described above, or another sensor configured to detect a pose or gesture or other input provided by a user may be used.

Figure 2:
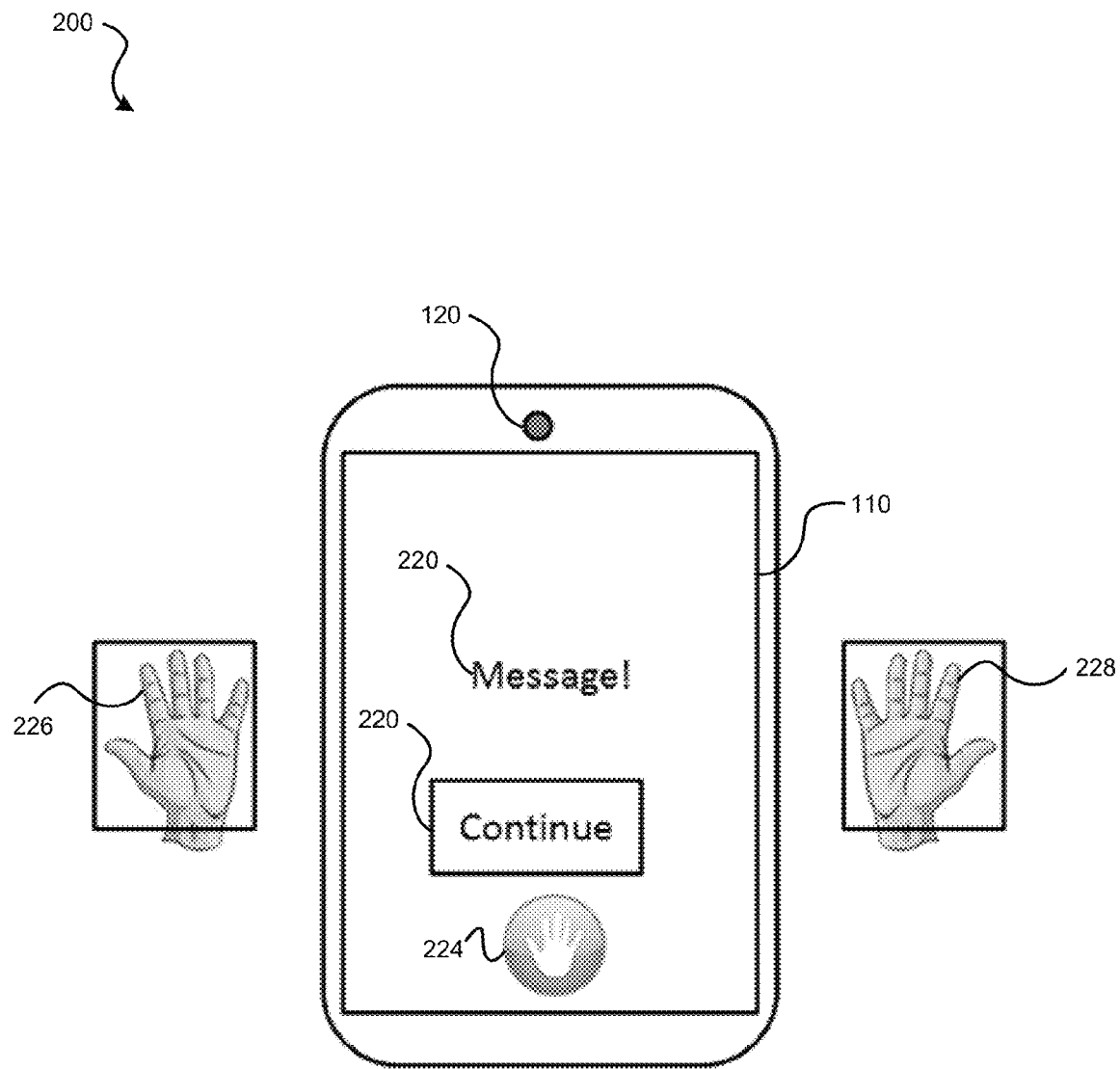
FIG. 2 illustrates another exemplary computing system, which is configured to detect a pose for interacting with a prompt according to some embodiments.

FIG. 2 illustrates an exemplary computing system (for example the computer system 100 illustrated in FIG. 1) configured to detect poses 226, 228 for interacting with a prompt 220 according to some embodiments. In one embodiment, the computing system is a mobile device 200, such as a smartphone. In other embodiments, the computing system may be other devices such as a tablet, television, personal computer, personal digital assistant, netbook, etc. The mobile device 200 includes one or more cameras 120 and an output device 110. In one embodiment, the output device 110 is a display device. The device 200 may present a user with prompts 220 and a pose request 224. A user may respond to the prompts 220 by performing user poses 226, 228. In one embodiment, the user poses are a left hand user pose 226 and a right hand user pose 228. It can be appreciated that the user poses are not limited to poses constructed by a user's hand and may be constructed by a user's legs, feet, toes, knees, ankles, stomach, chest, shoulders, arms, elbows, fingers and any other user body part or extremity. Furthermore, a pose may include a predefined pose. In some embodiments, the device 200 may prompt the user for a motion, for example a motion along a predefined path or in a predefined direction, or a combination of a pose and a motion. Camera 120 may be operable for detecting, obtaining and analyzing the user poses 226, 228 by capturing a plurality of images.

In some embodiments, a method of controlling the mobile device 200 with one or more cameras 120 comprises notifying a user using an output device 110 such as a display unit or a speaker that the mobile device 200 is waiting for an acknowledgement, capturing a series of images from a camera 120, analyzing those images, and determining if either a right or left hand or optionally both hands (or any other body parts or extremities) of the user have been detected in a manner similar to the pose request 224 or any other predefined pose. Once the user's pose is initially detected, the mobile device 200 may optionally display progressive feedback (see FIG. 3) or use some other means for sensory feedback until a predetermined state of detection has been achieved, for example the pose has been held for a sufficient time to trigger a desired result. Some examples of other means for sensory feedback include, but are not limited to, audio cues, vibration of the mobile device 200, etc.

Figure 7:
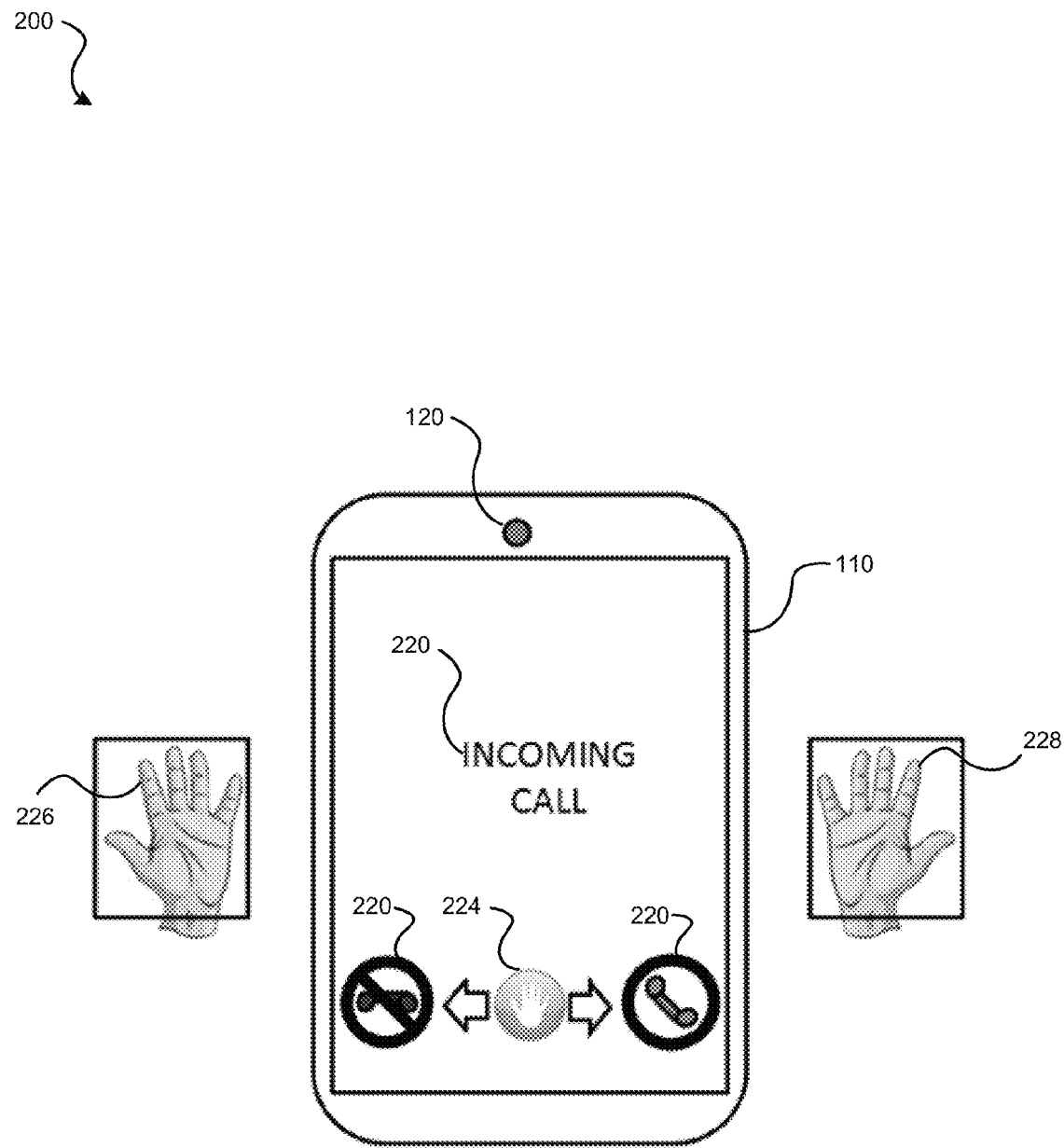
FIG. 7 illustrates another exemplary computing system, configured to detect a pose for interacting with a prompt according to some embodiments.

In some embodiments, the sufficient time may correlate to a particular confidence level of the gesture or pose being detected correctly. For example, the display 110 may present a progress indicator indicating to the user progress toward reaching the particular confidence level. In some embodiments, the sufficient time comprises an amount of time during which a user may not typically hold a pose, and thus may be used to ensure that the user is providing an intentional input, for example instead of fidgeting or motioning for another reason. The approach illustrated in FIG. 2 may be appropriate for a prompt 220 that is an informational message which may need an acknowledgement, but no decision between two options as is depicted in FIG. 7. For example, a mobile device 200 may announce that its battery has only 5% of its battery remaining. In some embodiments, the device 200 may determine that the user has provided an acknowledgement when either the left hand user pose 226 is detected or the right hand user pose 228 is detected. Thus, when the request 224 is displayed, the device may detect a hand in an open palm, fingers out pose regardless of which hand is used. In other embodiments, the device 200 may determine that the user has provided an acknowledgement when a particular hand is detected, for example a hand mirroring the pose displayed by the request 224.

In some embodiments, a method of controlling a mobile device 200 with a camera 120 includes notifying a user that the mobile device 200 may wait for an acknowledgement, capturing a series of images from a camera 120, analyzing those images, and determining if a pose 226, 228 has been detected. In the case where the pose 226, 228 can be detected when it is partially completed, then the mobile device 200 could optionally display a progressive feedback image or use some other progressive means for sensory feedback (see FIG. 3) until the pose has been fully completed and a desired result is triggered.

Figure 3:
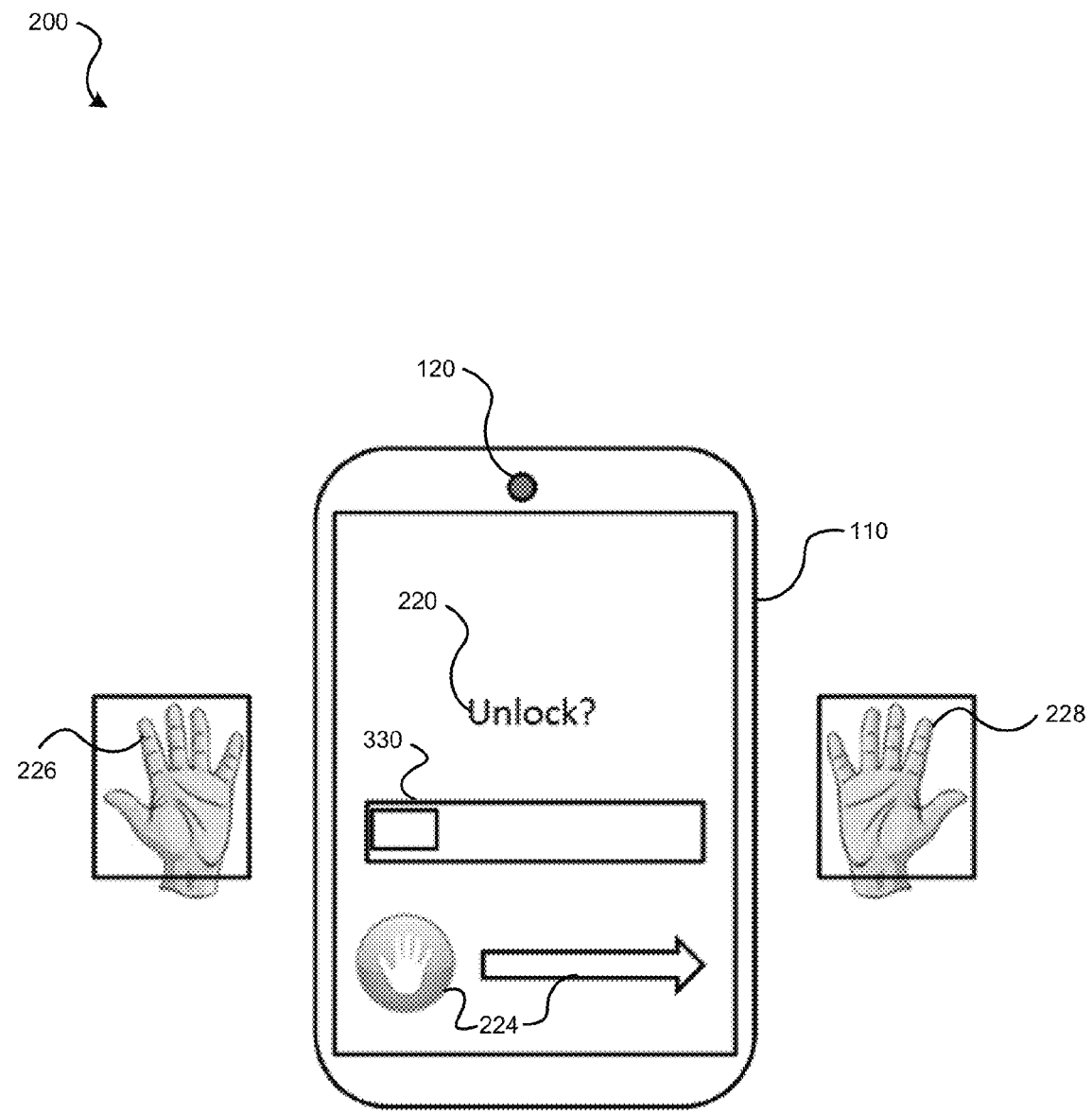
FIG. 3 illustrates another exemplary computing system, which is configured to detect a pose for unlocking a device according to some embodiments.

FIG. 3 illustrates another exemplary computing system (for example the computer system 100 illustrated in FIG. 1), which is configured to detect poses 226, 228 for unlocking a device according to some embodiments. In FIG. 3, the device 200 presents a progressive feedback image 330.

Figure 6:
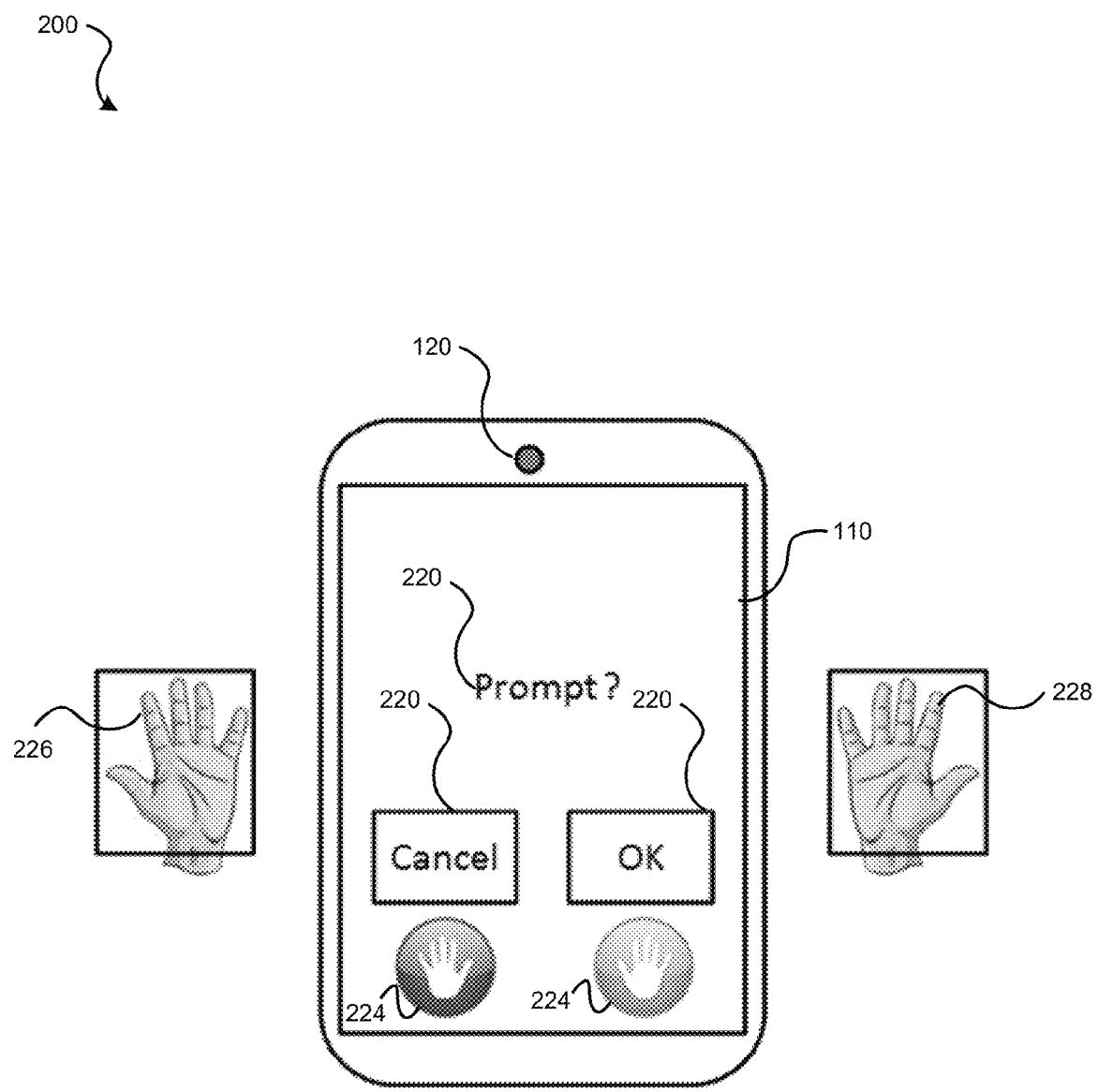
FIG. 6 illustrates another exemplary computing system, which is configured to detect a pose for interacting with a prompt according to some embodiments.

In one embodiment, a method of controlling a mobile device 200 with one or more cameras 120 comprises notifying a user using an output device 110 such as a display unit or a speaker that the mobile device 200 is waiting for an acknowledgement or command, capturing a series of images from a camera 120, analyzing those images, and determining if either the left hand user pose 226 and a right hand user pose 228 or optionally both hands of the user have been detected in an open palm pose or other predefined pose. It can be appreciated that the user poses are not limited to poses constructed by a user's hand and may be constructed by a user's legs, feet, toes, knees, ankles, stomach, chest, shoulders, arms, elbows, fingers and any other user body part or extremity. Furthermore, a pose may include a predefined pose. In some embodiments, the device 200 may prompt the user for a motion, for example a motion along a predefined path or in a predefined direction, or a combination of a pose and a motion. Once the user's pose 226, 228 is initially detected then the computer system may optionally display a progressive feedback image 330 or use some other progressive means for sensory feedback until the user pose 226, 228 has been held for sufficient time to be confirmed as an engagement with the system. In some embodiments, the device 200 displays the image 330 prior to the pose being detected, but does not update the image 330 until after detection of the pose. In an embodiment, the sufficient time may correlate to a particular confidence level. For example, the display 110 may present a progress indicator indicating to the user progress toward reaching the particular confidence level. Subsequently, the user could be prompted to move their hand (or other extremity) in a direction from that point to affirm their desire to acknowledge the prompt so that the desired result is triggered. In other embodiments, the device 200 may display to the user the prompt for hand motion prior to detection of the pose such that the user is aware that a pose and motion may be used to provide acknowledgement or command the device 200. The approach illustrated in FIG. 3 may be appropriate for an informational message which simply requires acknowledgement but no decision between two options as is depicted in FIG. 6. For instance, as depicted in the figure, such approach may be utilized by the device 200 to determine whether a user wants to unlock a computer system such as a mobile phone, tablet, or television.

In an embodiment, the mobile device 200 may initially display the unlock prompt 220 and the pose request 224 after the camera 120 detects the presence of a user. In this particular embodiment, the progressive feedback image 330 is a slide bar image. The slide bar image may continuously move side-to-side across the display in accordance with the movement of the user pose 226, 228. For example, the pose request 224 may depict an image of an open palm human right hand. The user may perform a right hand user pose 228 to unlock the mobile device 200. The mobile device 200 may initially present a prompt 220, pose request 224, and a progressive feedback image 330. The prompt 220 may be a message indicating to the user that an unlock is required prior to further interacting with the mobile device 200. The pose request 224 may include an image depicting a user extremity, in this case an image of a user's right hand. The pose request may also include an image depicting a motion in which a user should move the user extremity (right hand). As the user holds out their right hand in a pose similar to the pose depicted in the pose request 224 and moves their right hand in the motion depicted by the pose request 224, the progressive feedback image 330 continuously moves side-to-side across the display 110 in accordance with the user's right hand pose 228 movement. The mobile device 200 may unlock once the user completes the motion depicted by the pose request 224, indicated by the progressive feedback image 330 (slide bar) reaching a predefined location on the display 110. The user may then continue to interact with the mobile device 200. It can be appreciated that the pose request may depict an image of an open palm user left hand or any other body part or user extremity in any configuration along with any type of user extremity motion. The user may unlock the device using their corresponding body part or extremity by mimicking the depicted motion. In some embodiments, the user pose request 224 may become highlighted, change color, or visually alter in any other way to indicate to the user that the user pose 226, 228 has been correctly detected and that subsequent movement of the user pose 226, 228 will result in corresponding movement to the slidebar of the pose request 224. In some embodiments, the slidebar of the pose request 224 may be used to indicate to the user how long the user pose has been held instead of tracking user movement after the pose has been detected.

In an embodiment, the camera 120 may detect, capture, and analyze the user pose at predefined intervals. For example, the camera 120 may detect, capture, and analyze the user pose at predetermined time intervals (e.g. every 0.5 seconds). By detecting, capturing, and analyzing the user pose at predetermined time intervals, the mobile device 200 and engagement system may operate with a lower power profile versus constantly detecting, capturing, and analyzing the user pose. In an embodiment, the mobile device 200 and engagement system may dynamically increase how often frames are detected, captured, and analyzed based on the presence of a user body part or extremity in front of the display 110 or camera 120. For example, once a user pose is detected by the device 200, then a duty cycle of a camera and/or gesture or pose recognition engine may be increased to detect the pose or gestures or changes thereof with greater accuracy and/or lower latency.

Figure 4A:
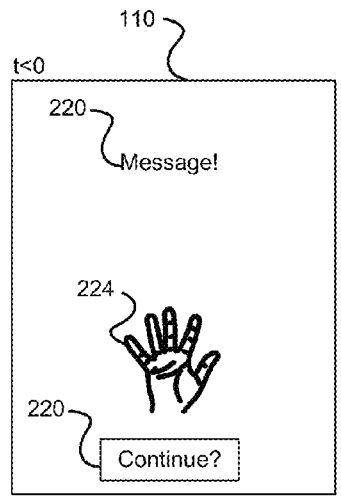
FIGS. 4A-4F illustrate another exemplary computing system, which is configured to detect a pose and employ progressive feedback according to some embodiments.

FIGS. 4A-4F illustrate another exemplary computing system, which is configured to detect poses and employ a progressive feedback image 330 according to some embodiments. As described above, the computer system may optionally display a progressive feedback image 330 or use some other progressive means for sensory feedback until a user pose has been held for sufficient time to be confirmed as an engagement with the system. In an embodiment, the sufficient time may correlate to a particular confidence level. In an embodiment, the progressive feedback image 330 may display a percentage toward reaching detection of the user pose, for example detecting that the user pose has been substantially maintained for a threshold amount of time. The progressive feedback image 330 may indicate progress toward reaching the particular confidence level. In FIG. 4A, prompts 220 are displayed with a message and an acknowledgment whether to continue interacting with the mobile device 200 (FIG. 2). Furthermore, a pose request 224 is displayed as an image of a right user hand indicating that the system accepts poses and which pose(s) are expected. FIG. 4A depicts the mobile device 200 (FIG. 2) display 110 at time t<0. Time t may be any unit of time, for example, seconds, milliseconds, etc. In an embodiment, no progressive feedback image 330 is displayed on display 110 at time t<0.

In some embodiments, there may not be a pose request 224 shown initially on the display 110. In some cases, the user may already have knowledge as to what a particular pose may be to interact with the system (e.g., when a particular engagement gesture is used to initiate interaction with the system). There may also be multiple potential poses associated for either initiating or controlling certain functionality. In such embodiments, the device 200 (FIG. 2) may only depict an image of the corresponding hand pose at or after the time that the hand pose is initially detected, thereby informing the user of the particular hand pose that is being detected or that the hand pose is being detected properly. In some embodiments, the progressive feedback 330 may then be displayed on display 110 to ensure that the hand pose is held for sufficient time to engage the system or provide some sort of input or command.

In an embodiment, once the camera 120 (FIG. 1) detects the presence of a user pose, at time t=0, a progressive feedback image 330 may be displayed on the display 110. For example, in this particular embodiment, the progressive feedback image 330 is a circular indication bar. The circular indication bar may indicate a user's progress in performing a user pose for a sufficient time to be confirmed as an engagement with the system. In an embodiment, the sufficient time may correlate to a particular confidence level. The progressive feedback image 330 may indicate progress toward reaching the particular confidence level. In an embodiment, the circular indication bar may indicate this progress by darkening, shading, coloring, pinching, erasing, etc. portions of the circular indication bar that correspond to the amount of time that has elapsed while the user is performing the user pose.

In this particular embodiment, the pose request 224 depicts an open palm user right hand. It can be appreciated that the user poses are not limited to poses constructed by a user's hand and may be constructed by a user's legs, feet, toes, knees, ankles, stomach, chest, shoulders, arms, elbows, fingers and any other user body part or extremity.

Figure 4B:
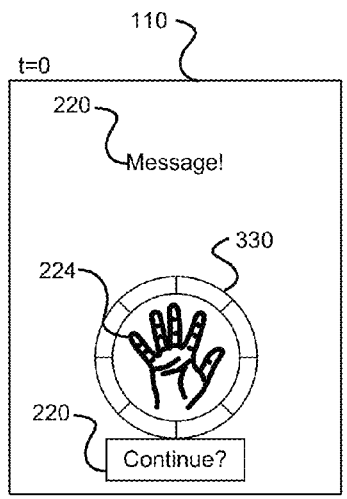

In FIG. 4B, a progressive feedback image 330 is displayed on the display 110. In an embodiment, the progressive feedback image 330 is a circular indication bar centered around the pose request 224. FIG. 4B depicts the mobile device 200 (FIG. 2) display 110 at a time t=0, i.e. once the camera 120 (FIG. 1) detects the presence of a user pose. The circular indication bar provides progressive feedback indicating that a user pose has been held for sufficient time to be confirmed as an engagement with the system. In an embodiment, the sufficient time may correlate to a particular confidence level. The progressive feedback image 330 may indicate progress toward reaching the particular confidence level. It can be appreciated that the progressive feedback image 330 may be any type of image that may provide progressive feedback to the user, e.g. rectangular indication bar, percentage indicator, animated image, etc.

Figure 4C:
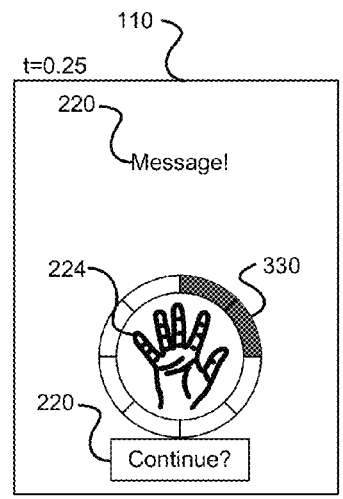

FIG. 4C depicts the mobile device 200 (FIG. 2) display 110 at a time t=0.25. In the depiction, the circular indication progressive feedback image 330 has two of its eight sections shaded. The shaded sections of the circular indication progressive feedback image 330 indicate the user's progress in completing interaction with the prompts 220 by using the user pose(s). In this example, the user has been performing the user pose similar to the pose request 224 for a time t=0.25.

Figure 4D:
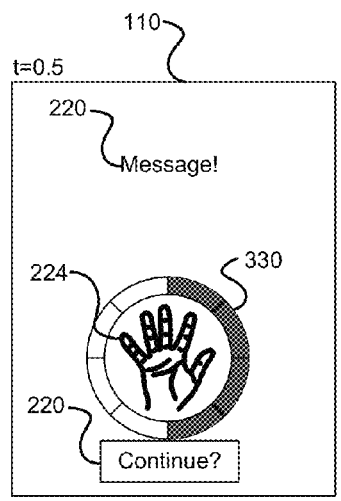

FIG. 4D depicts the mobile device 200 (FIG. 2) display 110 at a time t=0.5. In the depiction, the circular indication progressive feedback image 330 has four of its eight sections shaded. The shaded sections of the circular indication progressive feedback image 330 indicate the user's progress in completing interaction with the prompts 220 by using the user pose(s). In this example, the user has been performing the user pose similar to the pose request 224 for a time t=0.5.

Figure 4E:
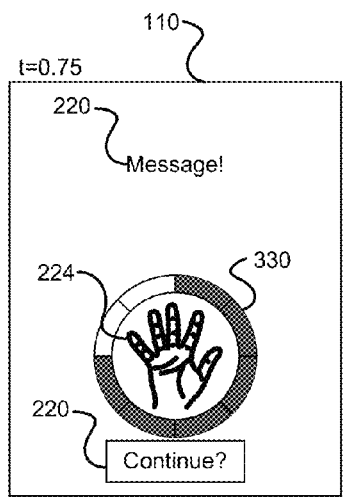

FIG. 4E depicts the mobile device 200 (FIG. 2) display 110 at a time t=0.75. In the depiction, the circular indication progressive feedback image 330 has six of its eight sections shaded. The shaded sections of the circular indication progressive feedback image 330 indicate the user's progress in completing interaction with the prompts 220 by using the user pose(s). In this example, the user has been performing the user pose similar to the pose request 224 for a time t=0.75.

Figure 4F:
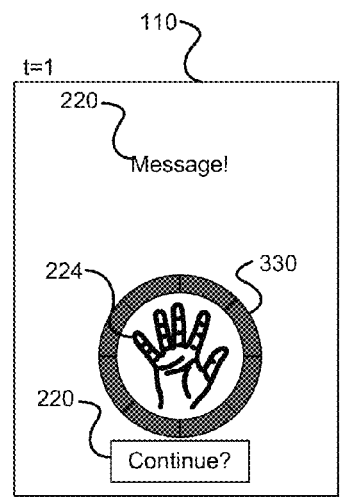

FIG. 4F depicts the mobile device 200 (FIG. 2) display 110 at a time t=1. In the depiction, the circular indication progressive feedback image 330 has all of its eight sections shaded. The shaded sections of the circular indication progressive feedback image 330 indicate the user's progress in completing interaction with the prompts 220 by using the user pose(s). In this example, the user has been performing the user pose similar to the pose request 224 for a time t=1. In this depiction, the user pose similar to the pose request 224 has been held sufficiently long enough to be confirmed by the system, at which time the progressive feedback image 330 is completely shaded and the user has completed acknowledgement of the prompts 220. In some embodiments, this acknowledgment may engage the system and enable further functionality. In an embodiment, the sufficient time may correlate to a particular confidence level. The progressive feedback image 330 may indicate progress toward reaching the particular confidence level.

Figure 5A:
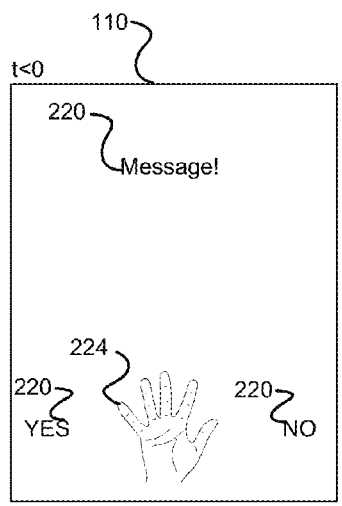
FIGS. 5A-5L illustrate another exemplary computing system, which is configured to detect a pose and employ progressive feedback according to some embodiments.

FIGS. 5A-5L illustrate another exemplary computing system, which is configured to detect poses and employ progressive feedback 330 according to some embodiments. As described above, the computer system may optionally display a progressive feedback image 330 or use some other progressive means for sensory feedback until a user pose has been held for sufficient time to be confirmed as an engagement with the system. In an embodiment, the sufficient time may correlate to a particular confidence level. The progressive feedback image 330 may indicate progress toward reaching the particular confidence level. In FIG. 5A, prompts 220 are displayed with a message and an acknowledgment requiring a YES or NO response for interaction with mobile device 200 (FIG. 2). Furthermore, a pose request 224 is displayed as an image of an open palm right user hand indicating that the system accepts poses and which pose(s) are expected. FIG. 4A depicts the mobile device 200 (FIG. 2) display 110 at time t<0. Time t may be any unit of time, for example, seconds, milliseconds, etc. In an embodiment, no progressive feedback image 330 is displayed on display 110 at time t<0.

In an embodiment, once the camera 120 (FIG. 1) detects the presence of a user pose, at time t=0, a progressive feedback image 330 may be displayed on the display 110. For example, in this particular embodiment, the progressive feedback image 330 may be an image overlaid over the pose request 224. The overlaid image may indicate a user's progress in performing a user pose for a sufficient time to be confirmed as an engagement with the system. In an embodiment, the sufficient time may correlate to a particular confidence level. The progressive feedback image 330 may indicate progress toward reaching the particular confidence level. In an embodiment, the overlaid image may indicate this progress by darkening, shading, coloring, pinching, erasing, etc. portions of the overlaid image that correspond to the amount of time that has elapsed while the user is performing the user pose.

In this particular embodiment, the pose request 224 depicts an open palm user right hand. It can be appreciated that the user poses are not limited to poses constructed by a user's hand and may be constructed by a user's legs, feet, toes, knees, ankles, stomach, chest, shoulders, arms, elbows, fingers and any other user body part or extremity.

Figure 5B:
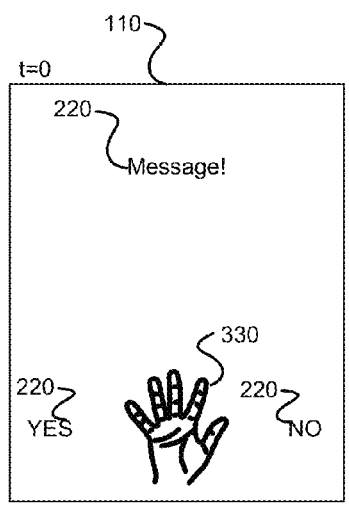

In FIG. 5B, a progressive feedback image 330 is displayed on the display 110. In an embodiment, the progressive feedback image 330 is overlaid on the pose request 224. FIG. 5B depicts the mobile device 200 (FIG. 2) display 110 at a time t=0, i.e. once the camera 120 (FIG. 1) detects the presence of a user pose. The overlaid image provides progressive feedback indicating that a user pose has been held for sufficient time to be confirmed as an engagement with the system. In an embodiment, the sufficient time may correlate to a particular confidence level. The progressive feedback image 330 may indicate progress toward reaching the particular confidence level. It can be appreciated that the progressive feedback image 330 may be any type of overlaid image that may provide progressive feedback to the user, e.g. rectangular indication bar, percentage indicator, animated image, etc. In this particular embodiment, the overlaid image depicts an open palm right user hand, the same image depicted by the pose request 224.

Figure 5C:
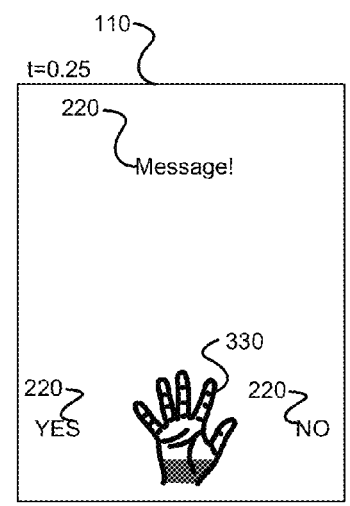

FIG. 5C depicts the mobile device 200 (FIG. 2) display 110 at a time t=0.25. In the depiction, the overlaid progressive feedback image 330 has roughly one-quarter of its overall height shaded. The shaded height of the overlaid progressive feedback image 330 indicates the user's progress in completing interaction with the prompts 220 by using the user pose(s). In this example, the user has been performing the user pose similar to the pose request 224 for a time t=0.25. It can be appreciated that the shading indicating the user's progress in completing interaction with the prompts 220 by using the user pose(s) may be shaded width-wise, diagonally, spirally, circularly, etc.

Figure 5D:
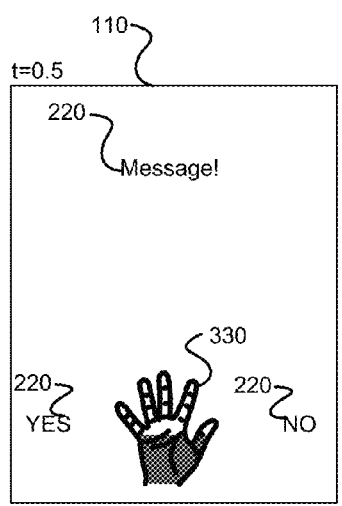

FIG. 5D depicts the mobile device 200 (FIG. 2) display 110 at a time t=0.5. In the depiction, the overlaid progressive feedback image 330 has roughly one-half of its overall height shaded. The shaded height of the overlaid progressive feedback image 330 indicates the user's progress in completing interaction with the prompts 220 by using the user pose(s). In this example, the user has been performing the user pose similar to the pose request 224 for a time t=0.5.

Figure 5E:
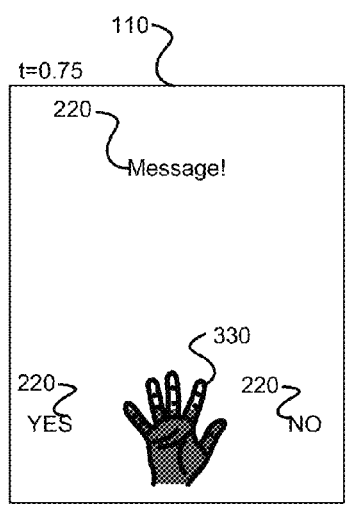

FIG. 5E depicts the mobile device 200 (FIG. 2) display 110 at a time t=0.75. In the depiction, the overlaid progressive feedback image 330 has roughly three-quarters of its overall height shaded. The shaded height of the overlaid progressive feedback image 330 indicates the user's progress in completing interaction with the prompts 220 by using the user pose(s). In this example, the user has been performing the user pose similar to the pose request 224 for a time t=0.75.

Figure 5F:
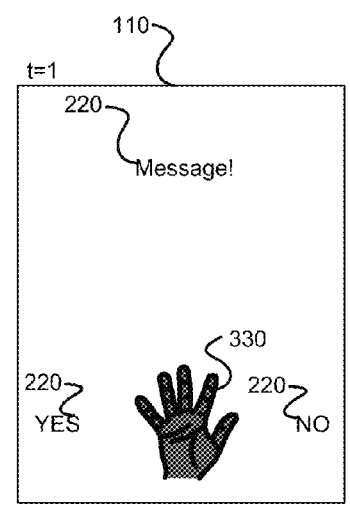

FIG. 5F depicts the mobile device 200 (FIG. 2) display 110 at a time t=1. In the depiction, the overlaid progressive feedback image 330 has all of its overall height shaded. The shaded height of the overlaid progressive feedback image 330 indicates the user's progress in completing interaction with the prompts 220 by using the user pose(s). In this example, the user has been performing the user pose similar to the pose request 224 for a time t=1. In this depiction, the user pose similar to the pose request 224 has been held sufficiently long enough to be confirmed by the system, at which time the progressive feedback image 330 is completely shaded and the user has completed acknowledgement of the prompts 220 and the system. In an embodiment, the sufficient time may correlate to a particular confidence level. The progressive feedback image 330 may indicate progress toward reaching the particular confidence level.

It can be appreciated that the progressive feedback image may, instead of overlaying the prompt request 224, replace the prompt request 224. It can be appreciated that other animations such as size or opacity of the progressive feedback image 330 may be used to indicate progressive feedback.

Figure 5G:
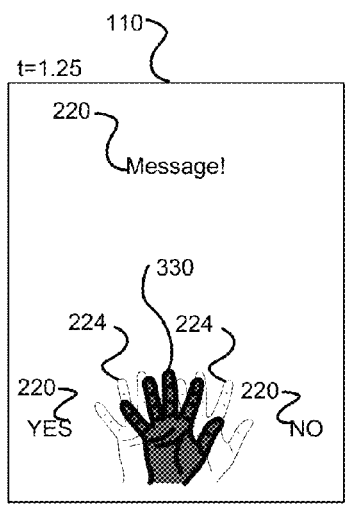

FIG. 5G depicts the mobile device 200 (FIG. 2) display 110 at a time t=1.25. In the depiction, the overlaid progressive feedback image 330 has all of its overall height shaded. The shaded height of the overlaid progressive feedback image 330 indicates the user's progress in completing interaction with the prompts 220 by using the user pose(s). In an embodiment, upon detecting the user pose for a sufficiently long amount of time, for example as illustrated in FIGS. 5A-5F, a new pair of pose requests 224 may appear on the display 110 for further interaction with the prompts 220. In an embodiment, the sufficient time may correlate to a particular confidence level. The progressive feedback image 330 may indicate progress toward reaching the particular confidence level. The pair of pose requests 224 may indicate to the user to move the user's pose in either direction to make a corresponding user prompt 220 choice. In this example, a user may select between a YES or NO response. The pair of pose requests 224 may be displayed behind the progressive feedback image 330 and may be animated to indicate the expected user pose motions. For example, the pose requests may animate and move towards the YES and NO prompts 220, individually. In an embodiment, the animation may be looped until a user completes the user pose motion and selects a user prompt 220 choice or the user stops performing the user pose. In this depiction, the pair of user pose requests 224 are one-third of the distance from the progressive feedback image 330 to the user prompts 220. In some embodiments, a pose motion may comprise a motion performed while a pose is substantially maintained. In the examples here, a motion that does not require a certain pose be maintained during movement may be implemented instead of the pose motion in some embodiments.

Figure 5H:
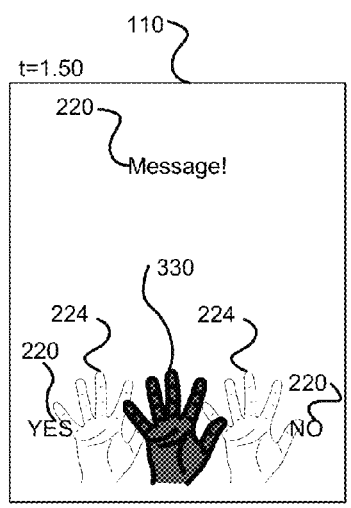

FIG. 5H depicts the mobile device 200 (FIG. 2) display 110 at a time t=1.5. In the depiction, the pair of user pose requests 224 are two-thirds of the distance from the progressive feedback image 330 to the user prompts 220.

Figure 5I:
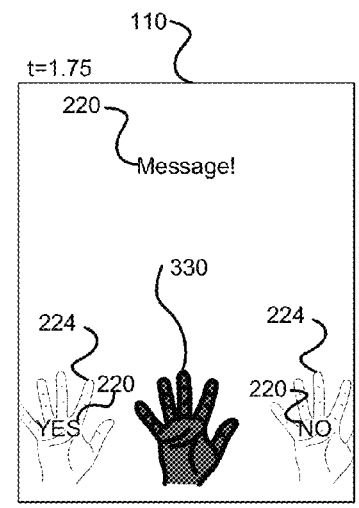

FIG. 5I depicts the mobile device 200 (FIG. 2) display 110 at a time t=1.75. In the depiction, the pair of user pose requests 224 have animated and moved the entire distance from the progressive feedback image 330 to the user prompts 220. In an embodiment, the animation may now be looped, restarting as depicted in FIG. 5G, until a user completes the user pose motion and selects a user prompt 220 choice or the user stops performing the user pose.

Figure 5J:
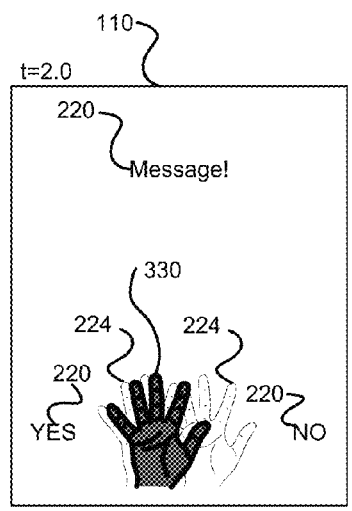

FIG. 5J depicts the mobile device 200 (FIG. 2) display 110 at a time t=2.0. In the depiction, the user has begun a user pose motion similar to the one illustrated by the pair of user pose requests 224 in FIGS. 5G-5I. In an embodiment, the progressive feedback image 330 animates and moves to indicate the distance the user pose has moved relative to the distance the user pose is expected to move (indicated by the animation and movement of the pair of user pose requests 224) to complete interaction with the prompts 220. In this depiction, the user's open palm right hand pose moves to the left edge of display 110 to indicate the user wishes to respond YES to the prompt 220. It can be appreciated that the user pose may be an open palm left hand pose. It can also be appreciated that the user pose may move anywhere with respect to the display 110 to interact with a prompt 220. In this depiction, the progressive feedback image 330 has moved roughly one-third the distance it is expected to move to complete interaction with the prompts 220.

Figure 5K:
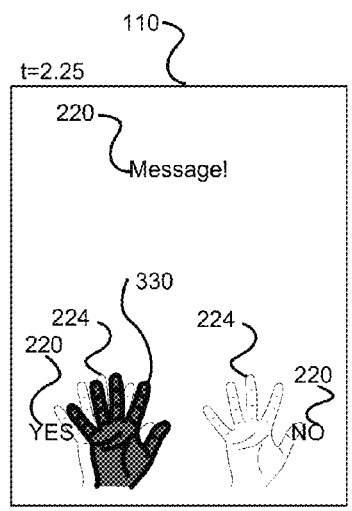

FIG. 5K depicts the mobile device (FIG. 2) display 110 at a time t=2.25. In the depiction, the progressive feedback image 330 has moved roughly two-thirds the distance the user pose is expected to move to complete interaction with the prompts 220.

Figure 5L:
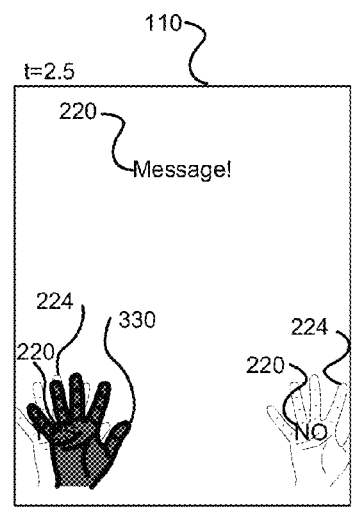

FIG. 5L depicts the mobile device (FIG. 2) display 110 at a time t=2.5. In the depiction, the progressive feedback image 330 has moved roughly the distance the user pose is expected to move to complete the interaction with the prompts 220. In the depiction, the user has now selected the YES user prompt 220 choice and interaction with the prompts 220 may be complete.

It can be appreciated that the embodiments of FIGS. 5A-5F may be used in combination with the embodiments described in FIGS. 5G-5L. That is, a user may hold a pose for a sufficient amount of time (e.g., until the progressive feedback image 330 is fully shaded) prior to the user moving the pose in either direction to make a corresponding user prompt choice and/or prior to one or more of the prompts 220 and the user pose requests 224 being displayed. In some embodiments, FIGS. 5A-5F may be used without FIGS. 5G-5L. In such embodiments, the YES and NO prompts 220 may be omitted in some implementations, for example when no choice is required by the user.

FIG. 6 illustrates another exemplary computing system, which is configured to detect poses 226, 228 for interacting with a prompt 220 according to some embodiments. In one embodiment, a method of controlling a mobile device 200 with one or more cameras 120 comprises notifying a user using an output device 110 such as a display unit or a speaker that the computer system is waiting for the user to select between two or more possible prompts 220, displaying the prompts on the left and right sides of the display 110, and then capturing a series of images from a camera 120, analyzing those images, and determining if either the right hand pose 228 or left hand pose 226 of the user has been detected in an open palm pose or other predefined pose. If the user wishes to choose the prompt 220 displayed on the left side on the screen (Cancel), then they can raise their left hand and hold it in the desired pose, shown by the pose request 224. If the user wishes to choose the prompt 220 displayed on the right side of the screen (OK) then they can raise their right hand and hold it in the desired pose. Once the user's pose is initially detected, the computer system can optionally display a progressive feedback image to the user or use some other progressive means for sensory feedback, as described above, until the pose has been held for a sufficient time to trigger the desired result. In an embodiment, the sufficient time may correlate to a particular confidence level. For example, the display 110 may present a progress indicator indicating to the user progress toward reaching the particular confidence level.

This approach may be appropriate for any "ok/cancel" or other dual option prompt 220 as shown in the figure. The display 110 may display prompts 220 along with pose requests 224. The pose requests 224 may depict a left hand user pose and a right hand user pose. The user may perform a user pose, a right hand user pose 228 may allow them invoke the action while a left hand user pose 226 may allow them cancel the action. In some embodiments, only one request 224 is shown, and the device 200 detects whether a pose represented by the request 224 is performed by the left hand or the right hand of the user and determines that one of the two options has been selected based on which hand was used to perform the pose.

In some embodiments, right hand pose 228 and left hand pose 226 may be entirely different. For example, right hand pose 228 may be an open hand pose while left hand pose 226 may be a closed hand pose, or vice versa. The closed hand pose may represent selection of the "Cancel" prompt while the open hand pose may represent selection of the "OK" prompt. In some embodiments, a plurality of poses may be presented to the user and/or accepted for each prompt. For example, the "Cancel" prompt might be selected by the closed hand pose or a peace sign pose formed with the hand, while the "OK" prompt might be selected by the open hand pose or an OK pose formed with the hand (e.g., with thumb and forefinger touching and the other fingers extended).

FIG. 7 illustrates another exemplary computing system, which is configured to detect poses 226, 228 for interacting with a prompt 220 according to some embodiments. In one embodiment, a method of controlling a mobile device 200 with one or more cameras 120 comprises notifying a user using an output device 110 such as a display unit or a speaker that the computer system is waiting for the user to select between two possible prompts by displaying the prompts on the left and right sides of the display, optionally displaying a single hand icon on the display 110, then capturing a series of images from a camera 120, analyzing those images, and determining if either the right hand or left hand of the user has been detected in an open palm pose or other predefined pose. Once the user's pose is initially detected then the mobile device 200 can optionally display a progressive feedback image to the user or use some other progressive means for sensory feedback, as described above, until the pose has been held for a sufficient time to be confirmed as an engagement. In an embodiment, the sufficient time may correlate to a particular confidence level. For example, the display 110 may present a progress indicator indicating to the user progress toward reaching the particular confidence level. Once engaged, the user can move to the left to engage the left hand side option, and to the right to engage the right hand side option. As the user moves towards that desired direction then the computer system can optionally display a progressive feedback image or other progressive means for sensory feedback until the movement is complete and the desired result is triggered. In some embodiments, the progressive feedback is omitted. For example, once the pose is initially detected, the device 200 may immediately track motion of the hand and select one of the prompts 220 based on the motion.

This approach would be appropriate for a call answering application as shown in the figure. When the phone rings, prompts 220 indicating an incoming call and options to either accept or reject the call may be displayed. In an embodiment, a prompt request 224 depicting an open palm right user hand may also be displayed on the display 110. The user may engage and select a prompt to accept or reject the call based on moving a user pose 226, 228 to the right or left edge of the display 110. In an embodiment, only a right hand user pose 228 will engage the mobile device 200 and use of a left hand user pose 226 will not be accepted. In another embodiment, either a right hand user pose 228 or a left hand user pose 226 may be used to engage the mobile device 200 and select a prompt 220.

Figure 8:
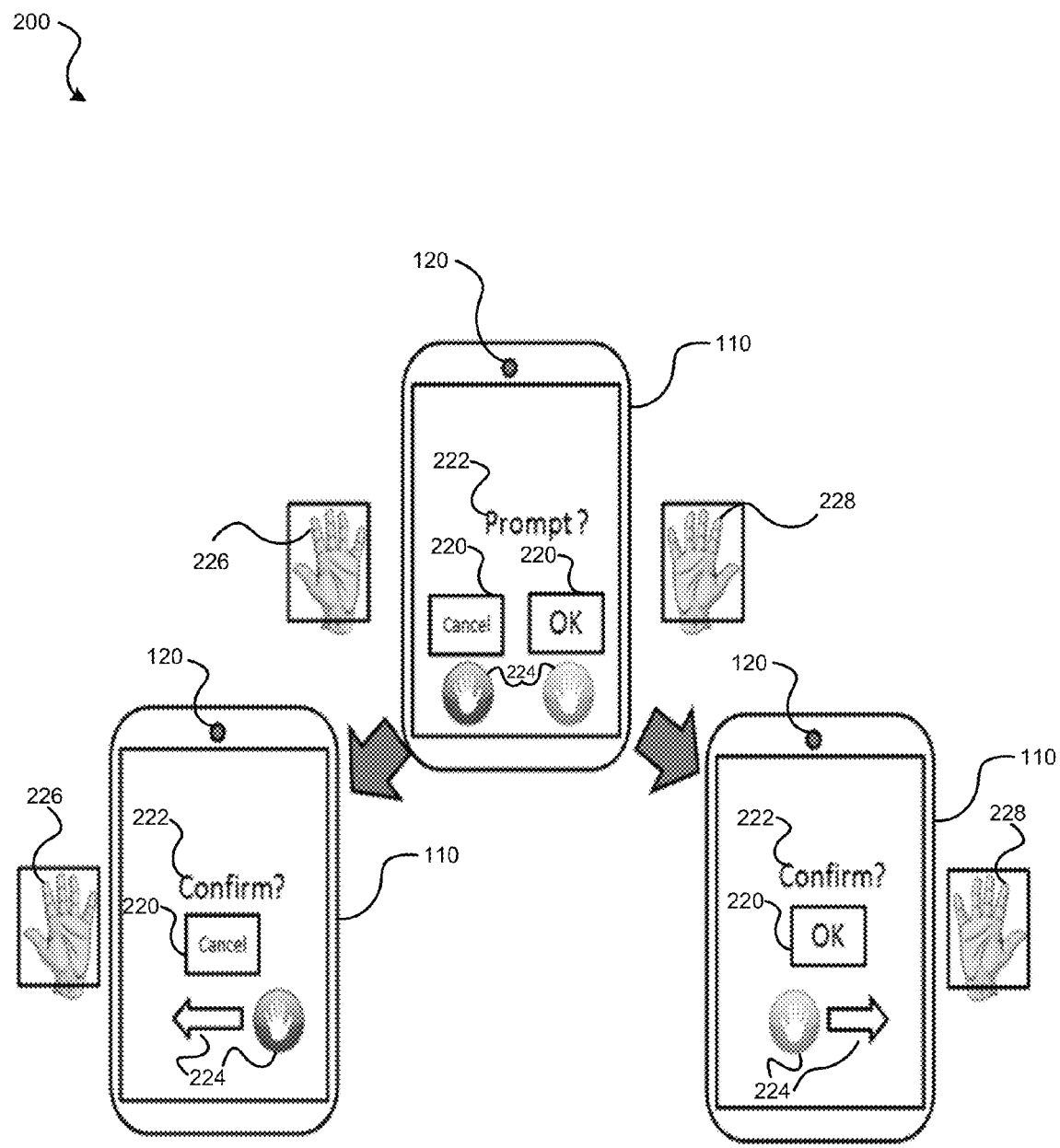
FIG. 8 illustrates another exemplary computing system, which is configured to detect a pose for interacting with a two-step prompt according to some embodiments.

FIG. 8 illustrates another exemplary computing system and engagement system using poses for interacting with a two-step prompt according to some embodiments. Upon a user interacting and engaging with a prompt 220 as described in FIG. 7, a new prompt 220 may be displayed based on the user's decision to the initial prompts 220. In an embodiment, a pose request 224 may include a pose and a motion for the user to perform. Subsequently, the user could be prompted to move their hand in a direction from that point to affirm their desire to acknowledge the prompt 220 so that the desired result is triggered. As the user moves towards that desired direction, the computer system can optionally display a progressive feedback image or other progressive means for sensory feedback until the movement is complete. This is demonstrated in the figure and could apply to any dual option prompt 220 that may require more deliberate confirmation due to its consequences.

Figure 9:
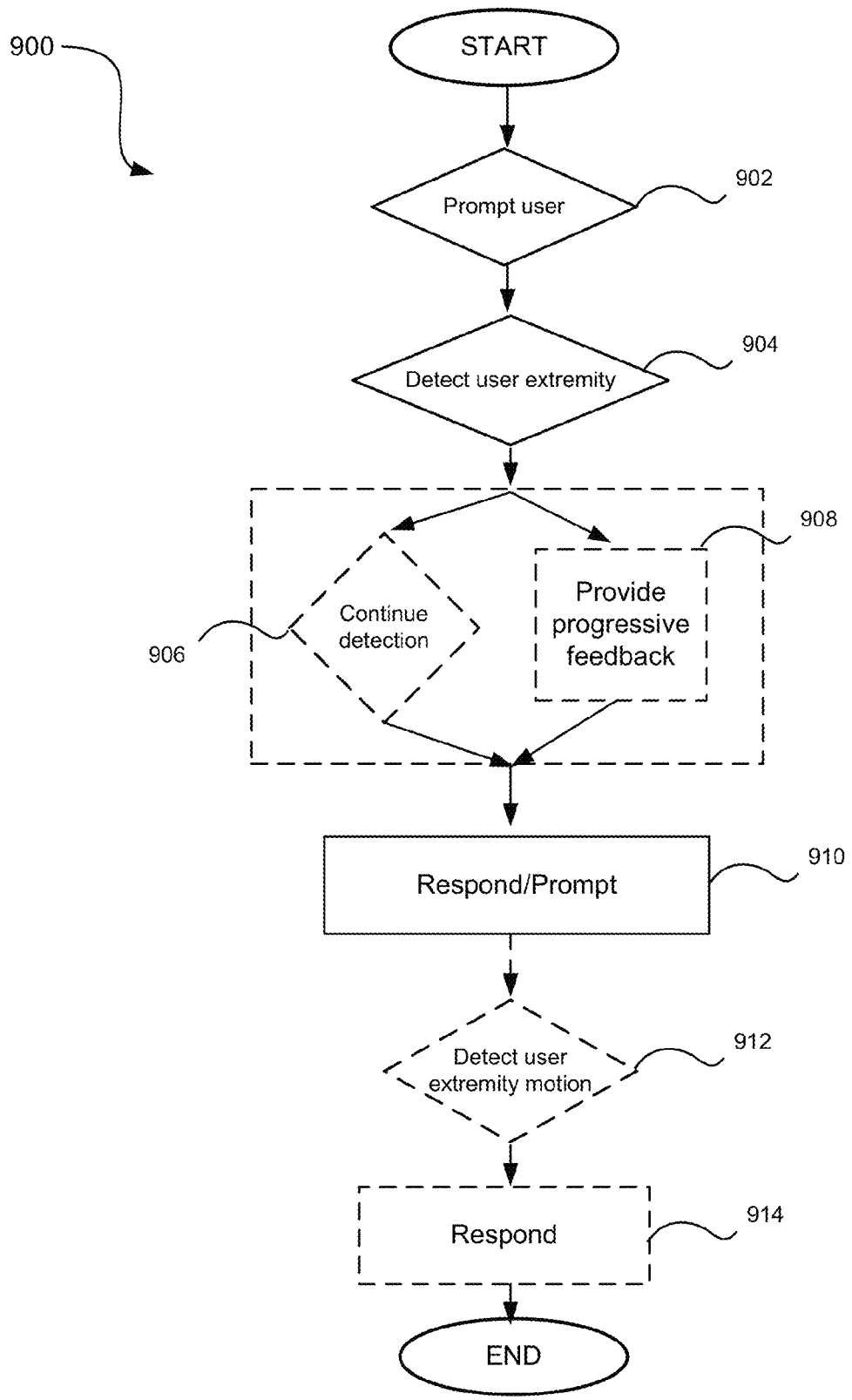
FIG. 9 is a flow diagram illustrating an exemplary embodiment for detecting a pose.

FIG. 9 is a flow diagram illustrating an exemplary embodiment of the invention for detecting poses. The method 900 is performed by processing logic, such as processor 104 (FIG. 1) that comprises hardware (circuitry, dedicated logic, etc.), software (such as is run on a general purpose computing system or a dedicated machine), firmware (embedded software), or any combination thereof. In one embodiment, the method 900 is performed by computer system 100 of FIG. 1 or mobile device 200 of FIG. 2. The software running on the computer system may comprise an operating system 114 (FIG. 1) and applications 116 (FIG. 1), stored in working memory 118 (FIG. 1) or on storage device 106 (FIG. 1).

Referring to FIG. 9, at block 902, the computer system prompts the user for a pose. In one implementation, the user is prompted for the pose using a display unit coupled to the computer system. The prompts displayed in FIGS. 2-8 on the display unit are exemplary embodiments of the prompt displayed at block 902. The display unit may be implemented as an output device 110, as illustrated in FIG. 1.

In response to the prompt, the user may respond with a pose. At block 904, the computer system detects a first pose. The computer system may detect a first pose by obtaining a plurality of images and analyzing the plurality of images to detect the pose. The images may be obtained via camera 120 of the computer system of FIG. 1. The pose may be generated by a user extremity. In one embodiment, the user extremity may be a user's left hand, right hand or both hands. The pose may be a hand-pose or any other pre-defined pose.

In some embodiments (for example, FIG. 6 and FIG. 8), the detection of a pose is based on the detection of the user extremity used for generating the pose. The computer system may take into consideration the distinction between the different user extremities used in generating the pose. In one example, the user may be prompted for the pose using a display unit coupled to the computer system, displaying horizontally at least two events to select from, wherein detection of the pose selects one of the at least two events.

For instance, a pose using the right hand and left hand may be associated with different meanings and consequently a different response. For example, detecting the user extremity that is a left hand selects the event displayed towards the left and detecting the user extremity that is a right hand selects the event displayed towards the right. Referring back to block 902, in some embodiments, the computer system may indicate to the user that the computer system differentiates a left hand from a right hand pose. For example, in FIG. 6, the "Cancel" command is associated with a pose or hand-pose using the left hand, whereas the "OK" command is associated with a pose or hand-pose using the right hand.

In one embodiment, detecting a first pose comprises detecting an initial presence of a user extremity, and optionally continuing to detect the presence of the user extremity for a pre-determined period of time while providing the user with progressive feedback to indicate to the user that detection is in progress. For instance, at block 906, once the user's first pose is initially detected then the computer system could optionally display a progressive feedback image or use some other progressive means for sensory feedback (block 908) until the first pose has been held steady for a pre-determined period of time. In one embodiment, the computer system uses the display unit, as discussed in FIG. 1 to provide feedback to the user.

At block 910, the computer system responds by either accepting the user's acknowledgement or prompting the user for another pose or motion of the pose. For instance, in FIG. 2, the computer system upon detection of the first pose accepts the acknowledgement by the user of the "message" and continues. Similarly, in FIG. 6, the computer system detects a left hand to interpret a "cancel" command and a right hand to interpret an "OK" command.

However, in some embodiments, the computer system prompts the user for an additional action or motion, such as prompting the user to move the user extremity in at least one direction. At block 912, the computer system detects that the user extremity moved in the at least one direction specified by the prompt. Further, at block 914, the computer system responds to the detection that the user extremity moved in the at least one specified direction. In one embodiment, the response may be as simple as accepting the acknowledgement or removing the prompt. The detection that the user extremity moved in the at least one specified direction may comprise an indication for an associated action with that direction. For instance, in FIG. 3, the computer system expects a swipe to confirm an "unlock" command. In FIG. 7, the computer system expects to detect a left or a right swipe motion in addition to detecting the pose. Similarly, in FIG. 8, the computer system expects to detect a left or a right swipe motion before confirming a "cancel" or "OK" command.

Figure 10:
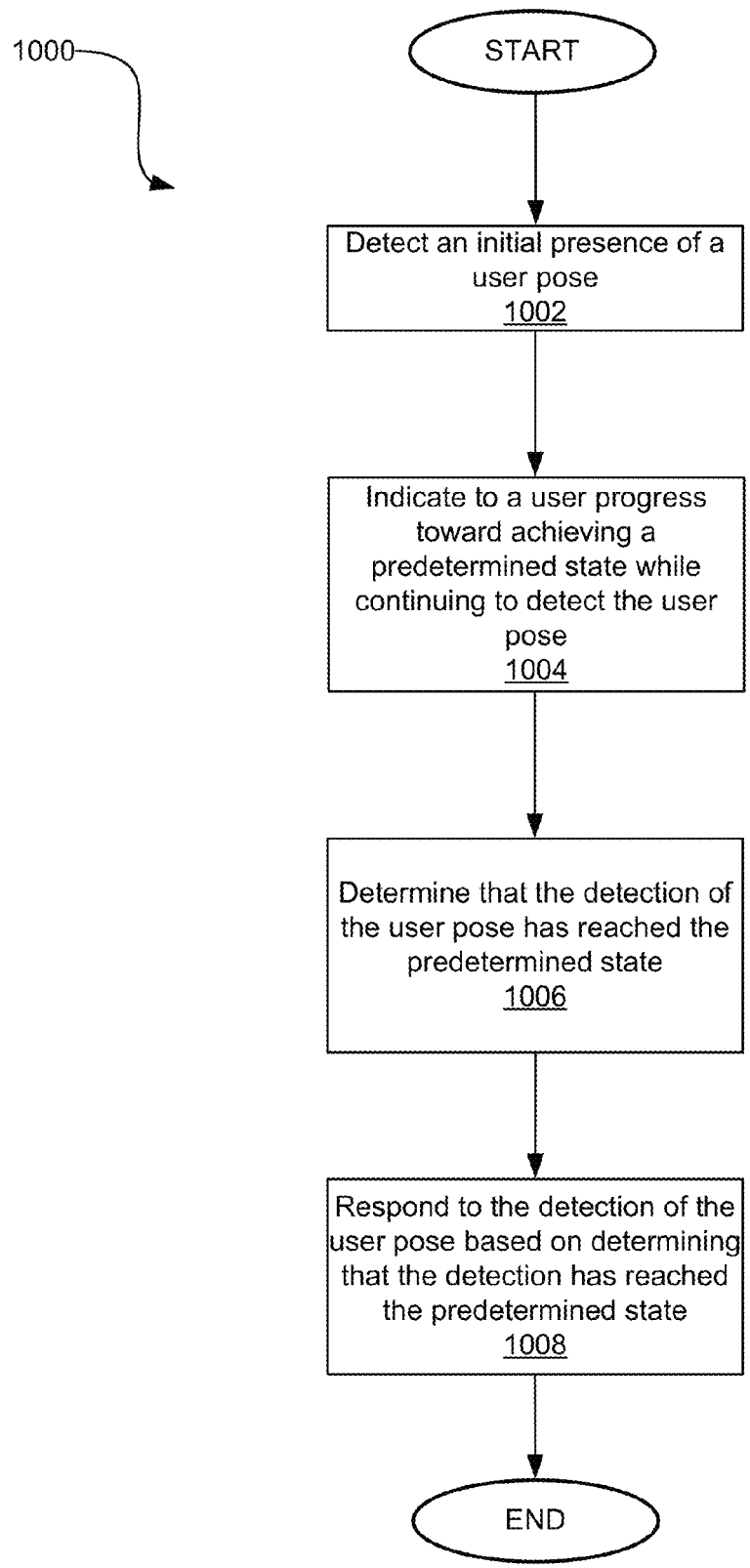
FIG. 10 is another flow diagram illustrating an exemplary embodiment for detecting a pose.

FIG. 10 is another flow diagram 1000 illustrating an exemplary embodiment of the invention for detecting poses according to some embodiments. The method 1000 is performed by processing logic, such as processor 104 (FIG. 1) that comprises hardware (circuitry, dedicated logic, etc.), software (such as is run on a general purpose computing system or a dedicated machine), firmware (embedded software), or any combination thereof. In one embodiment, the method 1000 is performed by computer system 100 of FIG. 1 or mobile device 200 of FIG. 2. The software running on the computer system may comprise an operating system 114 (FIG. 1) and applications 116 (FIG. 1), stored in working memory 118 (FIG. 1) or on storage device 106 (FIG. 1).

In block 1002, an initial presence of a user pose is detected. The computer system may detect a first pose by obtaining a plurality of images and analyzing the plurality of images to detect the pose. The images may be obtained via camera 120 of the computer system of FIG. 1. The pose may be generated by a user extremity. In one embodiment, the user extremity may be a user's left hand, right hand or both hands. The pose may be a hand-pose or any other pre-defined pose.

In some embodiments (for example, FIG. 6 and FIG. 8), the detection of a pose is based on the detection of the user extremity used for generating the pose. The computer system may take into consideration the distinction between the different user extremities used in generating the pose. In one example, the user may be prompted for the pose using a display unit coupled to the computer system, displaying horizontally at least two events to select from, wherein detection of the pose selects one of the at least two events.

For instance, a pose using the right hand and left hand may be associated with different meanings and consequently a different response. For example, detecting the user extremity that is a left hand selects the event displayed towards the left and detecting the user extremity that is a right hand selects the event displayed towards the right. For example, in FIG. 6, the "Cancel" command is associated with a pose or hand-pose using the left hand, whereas the "OK" command is associated with a pose or hand-pose using the right hand.

In one embodiment, detecting a first pose comprises detecting an initial presence of a user extremity, and optionally continuing to detect the presence of the user extremity for a pre-determined period of time while providing the user with progressive feedback to indicate to the user that detection is in progress. For instance, once the user's first pose is initially detected then the computer system could optionally display a progressive feedback image or use some other progressive means for sensory feedback (block 1004) until the first pose has been held steady for a pre-determined period of time. In one embodiment, the computer system uses the display unit, as discussed in FIG. 1 to provide feedback to the user.

In block 1006, a determination is made whether detection of the user pose has reached a predetermined state. In an embodiment, the determination is made after having indicating to the user progress toward achieving a predetermined state while continuing to detect the user pose (block 1004). The predetermined state may include holding the user pose for a predetermined period of time or engaging in a pose motion. For example, in FIG. 4F, the user pose has been held for a predetermined period of time and the progressive feedback image is completely shaded indicating that the user pose has reached the predetermined state. In some embodiments, the predetermined state may comprise a finite, predetermined motion having been performed by a control object, or the predetermined state may comprise the control object reaching a location or position determined based on the initial pose detection at block 102. Such predetermined states may be implemented, for example, in some embodiments of the computing system illustrated in FIGS. 3 and/or 5.

In block 1008, a response is generated to the detection of the user pose based on determining that the detection has reached the predetermined state. Upon detecting the user pose, the computer system may acknowledge the user decision or present the user with further prompts and options as depicted in FIG. 8. In an embodiment, the computer system may respond to the detection that a user extremity moved in at least one specified direction. In one embodiment, the response may be as simple as accepting the acknowledgement or removing the prompt. The response to the detection of the user pose may be, for example, acceptance of an incoming call or unlocking the mobile device, or displaying a message, among many other potential actions. The detection that the user extremity moved in the at least one specified direction may comprise an indication for an associated action with that direction. For instance, in FIG. 3, the computer system expects a swipe to confirm an "unlock" command. In FIG. 7, the computer system expects to detect a left or a right swipe motion in addition to detecting the pose. Similarly, in FIG. 8, the computer system expects to detect a left or a right swipe motion before confirming a "cancel" or "OK" command.

In some embodiments, a user may be prompted by displaying a representation of the user pose corresponding to an option for a user decision. The representation may be, for example, an image of an open palm hand pose or any other pose or gesture using a user extremity. The user decision may be detected based at least in part on determining that the detection of the user pose has reached the predetermined state. For example, the system has determined that the user pose has been performed for a certain amount time, or any other measureable threshold, the system may reach a particular confidence level and accept input of the user decision. For example, a user may choose to select an "OK" prompt displayed on the display device. A response to input of the user decision may be executed by the computer system.

Figure 11:
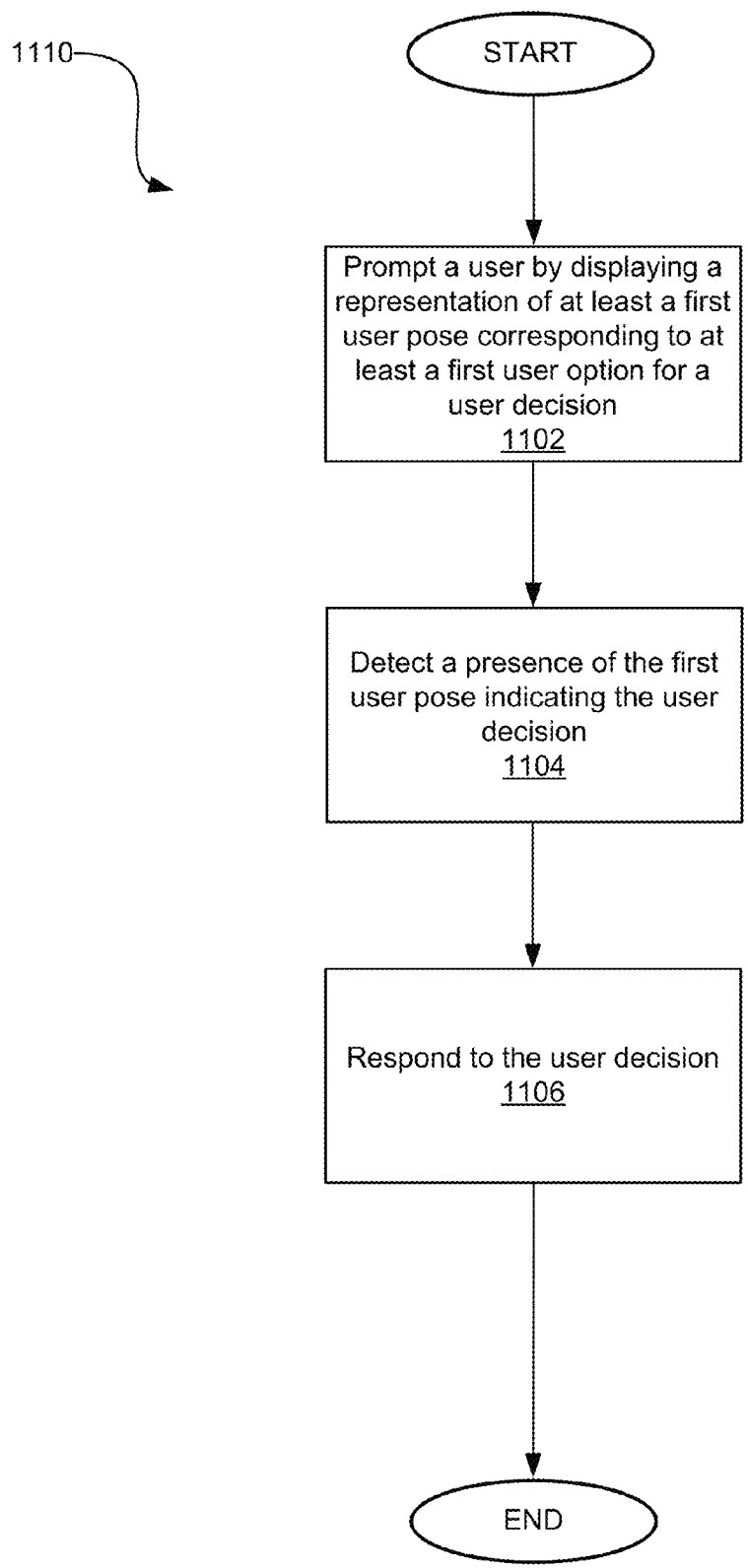
FIG. 11 is a flow diagram illustrating an exemplary embodiment for prompting a user for a pose.

FIG. 11 is a flow diagram 1100 illustrating an exemplary embodiment of the invention for prompting a user for a pose according to some embodiments. The method 1100 is performed by processing logic, such as processor 104 (FIG. 1) that comprises hardware (circuitry, dedicated logic, etc.), software (such as is run on a general purpose computing system or a dedicated machine), firmware (embedded software), or any combination thereof. In one embodiment, the method 1100 is performed by computer system 100 of FIG. 1 or mobile device 200 of FIG. 2. The software running on the computer system may comprise an operating system 114 (FIG. 1) and applications 116 (FIG. 1), stored in working memory 118 (FIG. 1) or on storage device 106 (FIG. 1).

In block 1102, a user is prompted by displaying a representation of at least a first user pose corresponding to at least a first user option for a user decision. The computer system prompts the user for a pose. In one implementation, the user is prompted for the pose using a display unit coupled to the computer system. The prompts displayed in FIGS. 2-8 on the display unit are exemplary embodiments of the prompt displayed at block 1102. The display unit may be implemented as an output device 110, as illustrated in FIG. 1. In an embodiment, the first user pose may correspond to at least a first user option for a user decision, as depicted in FIGS. 2-8.

In block 1104, a presence of the first user pose indicating the user decision is detected. The computer system may detect a first user pose by obtaining a plurality of images and analyzing the plurality of images to detect the pose. The images may be obtained via camera 120 of the computer system of FIG. 1. The pose may be generated by a user extremity. In one embodiment, the user extremity may be a user's left hand, right hand or both hands. The pose may be a hand-pose or any other pre-defined pose. The pose may correspond to and thus indicate a user decision.

In some embodiments (for example, FIG. 6 and FIG. 8), the detection of a pose is based on the detection of the user extremity used for generating the pose. The computer system may take into consideration the distinction between the different user extremities used in generating the pose. In one example, the user may be prompted for the pose using a display unit coupled to the computer system, displaying horizontally at least two events to select from, wherein detection of the pose selects one of the at least two events.

For instance, a pose using the right hand and left hand may be associated with different meanings and consequently a different response. For example, detecting the user extremity that is a left hand selects the event displayed towards the left and detecting the user extremity that is a right hand selects the event displayed towards the right. For example, in FIG. 6, the "Cancel" command is associated with a pose or hand-pose using the left hand, whereas the "OK" command is associated with a pose or hand-pose using the right hand.

In one embodiment, detecting a first pose comprises detecting an initial presence of a user extremity, and optionally continuing to detect the presence of the user extremity for a pre-determined period of time while providing the user with progressive feedback to indicate to the user that detection is in progress. For instance, once the user's first pose is initially detected then the computer system could optionally display a progressive feedback image or use some other progressive means for sensory feedback (block 1104) until the first pose has been held steady for a pre-determined period of time. In one embodiment, the computer system uses the display unit, as discussed in FIG. 1 to provide feedback to the user.

In block 1106, a response to the user decision is generated. Upon detecting the user pose, the computer system may acknowledge the user decision or present the user with further prompts and options as depicted in FIG. 8. In an embodiment, the computer system may respond to the detection that a user extremity moved in at least one specified direction. In one embodiment, the response may be as simple as accepting the acknowledgement or removing the prompt. The detection that the user extremity moved in the at least one specified direction may comprise an indication for an associated action with that direction. For instance, in FIG. 3, the computer system expects a swipe to confirm an "unlock" command. In FIG. 7, the computer system expects to detect a left or a right swipe motion in addition to detecting the pose. Similarly, in FIG. 8, the computer system expects to detect a left or a right swipe motion before confirming a "cancel" or "OK" command.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

FIG. 1 illustrates an exemplary computer system incorporating parts of the device employed in practicing embodiments of the invention. A computer system as illustrated in FIG. 1 may be incorporated as part of the above described computerized device. For example, computer system 100 can represent some of the components of a television, a mobile device, a server, a desktop, a workstation, a control or interaction system in an automobile, a tablet, a head mounted display (HMD), a netbook or any other suitable computing system. In some embodiments, the system 100 may be included in a healthcare device and may provide a healthcare professional with means to accept or acknowledge certain messages or statuses without touching the healthcare device. A mobile device may be any computing device with an image capture device or input sensory unit and a user output device. An image capture device or input sensory unit may be a camera device. A user output device may be a display unit. Examples of a mobile device include but are not limited to video game consoles, tablets, smart phones and any other hand-held devices. FIG. 1 provides a schematic illustration of one embodiment of a computer system 100 that can perform the methods provided by various other embodiments, as described herein, and/or can function as the host computer system, a remote kiosk/terminal, a point-of-sale device, a telephonic or navigation or multimedia interface in an automobile, a mobile device, a set-top box, a table computer and/or a computer system. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer system 100 is shown comprising hardware elements that can be electrically coupled via a bus 102 (or may otherwise be in communication, as appropriate). The hardware elements may include one or more processors 104, including without limitation one or more general-purpose processors and/or one or more special-purpose processors (such as digital signal processing chips, graphics acceleration processors, and/or the like); one or more input devices 108, which can include without limitation one or more cameras, sensors, a mouse, a keyboard, a microphone configured to detect ultrasound or other sounds, and/or the like; and one or more output devices 110, which can include without limitation a display unit such as the device used in embodiments of the invention, a printer and/or the like. The processor 104 or another element of the system 100 may cause the output device 110 to display any of the indications or prompts to the user discussed above, for example the prompt 220, the request 224, and/or the image 330. In some embodiments, one or more of the input device 108—for example a microphone sensitive to ultrasonic frequency and/or an inertial measurement unit—may be used in addition or instead of a camera in the examples described above with respect to FIGS. 2-11 to detect a pose or gesture or other input provided by a user. Additional cameras 120 may be employed for detection of user's extremities and gestures. In some implementations, input devices 108 may include one or more sensors such as infrared and ultrasound sensors.

It can be appreciated that some elements of computer system 100 may also be externally attached to the computer system 100. For example, camera 120 may be externally connected to computer system 100 (e.g., via a universal serial bus connection) and also capture images for processing by the computer system 100. In some embodiments, the processing may be done by processor 104 or by other external subsystems.

In some implementations of the embodiments of the invention, various input devices 108 and output devices 110 may be embedded into interfaces such as display devices, tables, floors, walls, and window screens. Furthermore, input devices 108 and output devices 110 coupled to the processors may form multi-dimensional tracking systems.

The computer system 100 may further include (and/or be in communication with) one or more non-transitory storage devices 106, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 100 might also include a communications subsystem 112, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 112 may permit data to be exchanged with a network, other computer systems, and/or any other devices described herein. In many embodiments, the computer system 100 will further comprise a non-transitory working memory 118, which can include a RAM or ROM device, as described above.

The computer system 100 also can comprise software elements, shown as being currently located within the working memory 118, including an operating system 114, device drivers, executable libraries, and/or other code, such as one or more application programs 116, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 106 described above. In some cases, the storage medium might be incorporated within a computer system, such as computer system 100. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 100 and/or might take the form of source and/or installable code, which, upon compilation and/or installation on the computer system 100 (e.g., using any of a variety of generally available compilers, installation programs, compression/decompression utilities, etc.) then takes the form of executable code. In some embodiments, the processing of the instructions may take place at an application 116 level within working memory 118 of the computer system 100. In other embodiments, the processing of the instructions may take place in within processor 104. In further embodiments, the processing of the instructions may take place within a dedicated gesture recognition chip (not shown) or application processor of computer system 100. In some embodiments, operations or functionality as described with respect to FIGS. 2-11 is incorporated into or implemented in the operating system 114, which may comprise a high level operation system (HLOS) in some embodiments.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 100 may be omitted or may be implemented separate from the illustrated system. For example, the processor 104 and/or other elements may be implemented separate from the input device 108. In one embodiment, the processor is configured to receive images from one or more cameras that are separately implemented. In some embodiments, elements in addition to those illustrated in FIG. 1 may be included in the computer system 100.

Some embodiments may employ a computer system (such as the computer system 100) to perform methods in accordance with the disclosure. For example, some or all of the procedures of the described methods may be performed by the computer system 100 in response to processor 104 executing one or more sequences of one or more instructions (which might be incorporated into the operating system 114 and/or other code, such as an application program 116) contained in the working memory 118. Such instructions may be read into the working memory 118 from another computer-readable medium, such as one or more of the storage device(s) 106. Merely by way of example, execution of the sequences of instructions contained in the working memory 118 might cause the processor(s) 104 to perform one or more procedures of the methods described herein.

The terms "machine-readable medium" and "computer-readable medium," as used herein, refer to any medium that participates in providing data that causes a machine to operate in a specific fashion. In an embodiment implemented using the computer system 100, various computer-readable media might be involved in providing instructions/code to processor(s) 104 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 106. Volatile media include, without limitation, dynamic memory, such as the working memory 118. Transmission media include, without limitation, coaxial cables, copper wire and fiber optics, including the wires that comprise the bus 102, as well as the various components of the communications subsystem 112 (and/or the media by which the communications subsystem 112 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 104 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 100. These signals, which might be in the form of electromagnetic signals, acoustic signals, optical signals and/or the like, are all examples of carrier waves on which instructions can be encoded, in accordance with various embodiments of the invention.

The communications subsystem 112 (and/or components thereof) generally will receive the signals, and the bus 102 then might carry the signals (and/or the data, instructions, etc. carried by the signals) to the working memory 118, from which the processor(s) 104 retrieves and executes the instructions. The instructions received by the working memory 118 may optionally be stored on a non-transitory storage device 106 either before or after execution by the processor(s) 104.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 104—configured to perform the functions or methods. Further, such functions or methods may be performed by a processor executing instructions stored on one or more computer readable media.

Having described several embodiments above, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the description above does not limit the scope of the disclosure.

Various examples have been described. These and other examples are within the scope of the following claims.

What is claimed is:

1. A method, comprising:
   displaying, to a user, a first image indicative of a pose request;
   detecting an initial presence of a user pose in response to the first image;
   indicating to the user progress toward achieving a predetermined state of detection while continuing to detect the user pose, wherein indicating progress to the user comprises overlaying a second image upon the first image;
   having indicated progress to the user, determining that the predetermined state of detection has been achieved;
   providing to the user an indication of a user motion to be completed subsequent to the predetermined state of detection being achieved; and
   responding to the user motion based on determining that the predetermined state of detection has been achieved.

2. The method of claim 1 further comprising:
   prompting the user by displaying a representation of a plurality of potential user poses comprising the user pose, each of the plurality of potential user poses corresponding to an option for a user decision; and
   detecting the user decision based at least in part on determining that the predetermined state of detection has been achieved,
   wherein the responding comprises responding to the user decision.

3. The method of claim 1 wherein the determining comprises obtaining and analyzing a plurality of images.

4. The method of claim 1 wherein the responding comprises accepting acknowledgment for a notification event.

5. The method of claim 1 wherein the detecting comprises detecting a hand pose of the user.

6. The method of claim 1 wherein the predetermined state comprises the user pose having been detected for a predetermined period of time.

7. The method of claim 1 wherein the predetermined state comprises detection of the user pose reaching a particular confidence level.

8. The method of claim 1 wherein the indicating comprises displaying a circular indication bar comprising a plurality of regions, wherein the plurality of regions indicate the progress.

9. The method of claim 1 wherein the indicating comprises displaying an animated image of the user pose, wherein portions of the user pose are selectively animated to indicate the progress.

10. The method of claim 1 wherein the indicating comprises displaying a percentage toward achieving the predetermined state.

11. The method of claim 1 wherein the indicating comprises providing to the user sequential indications of the progress until it has been determined that the predetermined state has been achieved or until the user pose is no longer detected.

12. The method of claim 1, wherein overlaying the second image upon the first image comprises changing the size of the first image.

13. The method of claim 1, wherein overlaying the second image upon the first image comprises changing the opacity of the first image.

14. The method of claim 1, wherein overlaying the second image upon the first image comprises performing on the first image at least one of darkening, shading, coloring, pinching, or erasing.

15. An apparatus comprising:
   a display device configured to display a first image indicative of a pose request;
   an image capture device configured to capture images;
   a user output device configured to provide output to a user;
   a processor coupled to the image capture device and the user output device;
      wherein the processor is configured to detect an initial presence of a user pose in response to the first image, based on images captured by the image capture device;
      wherein the processor is configured to indicate to a user progress toward achieving a predetermined state of detection by using the user output device and continuing to detect the user pose, wherein indicating progress to the user comprises overlaying a second image upon the first image;

wherein the processor is configured to, having indicated progress to the user, determine that the predetermined state of detection has been achieved;

wherein the processor is configured to cause the user output device to provide to the user an indication of a user motion to be completed subsequent to the predetermined state of detection being achieved; and wherein the processor is configured to respond to the user motion based on determining that the predetermined state of detection has been achieved.

16. The apparatus of claim 15 wherein the processor is further configured to:

prompt the user by displaying a representation of a plurality of potential user poses comprising the user pose, each of the plurality of potential user poses corresponding to an option for a user decision; and detect the user decision based at least in part on determining that the predetermined state of detection has been achieved, wherein the responding comprises responding to the user decision.

17. The apparatus of claim 15 wherein the determining comprises obtaining and analyzing a plurality of images.

18. The apparatus of claim 15 wherein the responding comprises accepting acknowledgment for a notification event.

19. The apparatus of claim 15 wherein the detecting comprises detecting a hand pose of the user.

20. The apparatus of claim 15 wherein the predetermined state comprises the user pose having been detected for a predetermined period of time.

21. The apparatus of claim 15 wherein the predetermined state comprises detection of the user pose reaching a particular confidence level.

22. The apparatus of claim 15 wherein the indicating comprises displaying a circular indication bar comprising a plurality of regions, wherein the plurality of regions indicate the progress.

23. The apparatus of claim 15 wherein the indicating comprises displaying an animated image of the user pose, wherein portions of the user pose are selectively animated to indicate the progress.

24. The apparatus of claim 15 wherein the indicating comprises displaying a percentage toward achieving the predetermined state.

25. The apparatus of claim 15 wherein the indicating comprises providing to the user sequential indications of the progress until it has been determined that the predetermined state has been achieved or until the user pose is no longer detected.

26. An apparatus comprising:

means for displaying, to a user, a first image indicative of a pose request;

means for detecting an initial presence of a user pose in response to the first image;

means for indicating to the user progress toward achieving a predetermined state of detection while continuing to detect the user pose, wherein indicating progress to the user comprises overlaying a second image upon the first image;

having indicated progress to the user, means for determining that the predetermined state of detection has been achieved;

means for providing to the user an indication of a user motion to be completed subsequent to the predetermined state of detection being achieved; and means for responding to the user motion based on determining that the predetermined state of detection has been achieved.

27. The apparatus of claim 26 further comprising:

means for prompting the user by displaying a representation of a plurality of potential user poses comprising the user pose, each of the plurality of potential user poses corresponding to an option for a user decision; and means for detecting the user decision based at least in part on determining that the predetermined state of detection has been achieved, wherein the responding comprises responding to the user decision.

28. The apparatus of claim 26 wherein the determining comprises obtaining and analyzing a plurality of images.

29. The apparatus of claim 26 wherein the responding comprises accepting acknowledgment for a notification event.

30. The apparatus of claim 26 wherein the detecting comprises detecting a hand pose of the user.

31. The apparatus of claim 26 wherein the predetermined state comprises the user pose having been detected for a predetermined period of time.

32. The apparatus of claim 26 wherein the predetermined state comprises detection of the user pose reaching a particular confidence level.

33. The apparatus of claim 26 wherein the indicating comprises displaying a circular indication bar comprising a plurality of regions, wherein the plurality of regions indicate the progress.

34. The apparatus of claim 26 wherein the indicating comprises displaying an animated image of the user pose, wherein portions of the user pose are selectively animated to indicate the progress.

35. The apparatus of claim 26 wherein the indicating comprises displaying a percentage toward achieving the predetermined state.

36. The apparatus of claim 26 wherein the indicating comprises providing to the user sequential indications of the progress until it has been determined that the predetermined state has been achieved or until the user pose is no longer detected.

37. A non-transitory processor-readable medium comprising processor-readable instructions configured to cause a processor to:

display, to a user, a first image indicative of a pose request;

detect an initial presence of a user pose in response of a pose request;

indicate to the user progress toward achieving a predetermined state while continuing to detect the user pose, wherein indicating progress to the user comprises overlaying a second image upon the first image;

having provided the user with indication that detection is in progress, determine that the detection of the user pose has reached the predetermined state;

provide to the user an indication of a user motion to be completed subsequent to the predetermined state of detection being achieved; and respond to the detection of the user motion based on determining that the detection has reached the predetermined state.

* * * * *